United States Patent
Yang et al.

(10) Patent No.: US 12,085,782 B2
(45) Date of Patent: Sep. 10, 2024

(54) OPTICAL SYSTEM, CAMERA MODULE, AND ELECTRONIC DEVICE

(71) Applicant: JIANGXI JINGCHAO OPTICAL CO., LTD., Nanchang (CN)

(72) Inventors: Jian Yang, Nanchang (CN); Ming Li, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 489 days.

(21) Appl. No.: 17/609,381

(22) PCT Filed: Mar. 16, 2020

(86) PCT No.: PCT/CN2020/079517
§ 371 (c)(1),
(2) Date: Nov. 6, 2021

(87) PCT Pub. No.: WO2021/184165
PCT Pub. Date: Sep. 23, 2021

(65) Prior Publication Data
US 2022/0214521 A1    Jul. 7, 2022

(51) Int. Cl.
*G02B 9/64* (2006.01)
*G02B 13/00* (2006.01)
(52) U.S. Cl.
CPC ........... *G02B 9/64* (2013.01); *G02B 13/0045* (2013.01)
(58) Field of Classification Search
CPC ........ G02B 9/64; G02B 13/0045; G02B 7/02; G02B 27/0025; G02B 7/021; G02B 7/022;
(Continued)

(56) References Cited

U.S. PATENT DOCUMENTS

| 4,981,344 A | 1/1991 | Ueda |
|---|---|---|
| 6,414,800 B1 | 7/2002 | Hamano |

(Continued)

FOREIGN PATENT DOCUMENTS

| CN | 1206842 A | 2/1999 |
|---|---|---|
| CN | 1297164 A | 5/2001 |

(Continued)

OTHER PUBLICATIONS

International Search Report on International Patent Application PCT/CN2019/122072, filed Nov. 29, 2019, in the name of Jiangxi Jingchao Optical Co. Ltd.

(Continued)

*Primary Examiner* — Darryl J Collins
*Assistant Examiner* — Matthew Y Lee
(74) *Attorney, Agent, or Firm* — Franklin & Associates International Inc; Matthew Lambrinos

(57) ABSTRACT

An optical system includes, successively in order from an object side to an image side: a first lens, an object side surface thereof being concave at a paraxial area, and an image side surface thereof being convex at the paraxial area thereof; a second lens having a positive refractive power, an object side surface thereof being convex at a paraxial area, and an image side surface thereof being concave at the paraxial area; a third lens having a positive refractive power, and an image side surface thereof being convex at a paraxial area; a fourth lens; a fifth lens; a sixth lens; a seventh lens; and an eighth lens having a negative refractive power, an object side surface thereof being convex at a paraxial area, and an image side surface thereof being concave at the paraxial area.

20 Claims, 7 Drawing Sheets

(58) Field of Classification Search
CPC ............ G02B 13/0015; G02B 13/0055; G02B 13/005
See application file for complete search history.

(56) References Cited

U.S. PATENT DOCUMENTS

| | | | |
|---|---|---|---|
| 6,985,309 | B2 | 1/2006 | Shinohara |
| 9,057,868 | B1 | 6/2015 | Chung et al. |
| 11,971,609 | B2* | 4/2024 | Chen ................ G02B 9/64 |
| 2004/0218285 | A1 | 11/2004 | Amanai |
| 2004/0264003 | A1 | 12/2004 | Noda |
| 2005/0046970 | A1 | 3/2005 | Amanai |
| 2008/0106801 | A1 | 5/2008 | Kang et al. |
| 2010/0254029 | A1 | 10/2010 | Shinohara |
| 2012/0075718 | A1 | 3/2012 | Seo |
| 2014/0063620 | A1 | 3/2014 | Jung et al. |
| 2015/0138425 | A1 | 5/2015 | Lee et al. |
| 2016/0124192 | A1 | 5/2016 | Koreeda |
| 2016/0161709 | A1 | 6/2016 | Hsueh et al. |
| 2017/0052350 | A1* | 2/2017 | Chen ................ G02B 5/005 |
| 2017/0307858 | A1 | 10/2017 | Chen |
| 2018/0113282 | A1 | 4/2018 | Tsai |
| 2020/0073092 | A1 | 3/2020 | Chen |
| 2020/0393652 | A1* | 12/2020 | Kuo ................ G02B 9/64 |
| 2021/0048633 | A1* | 2/2021 | Hirano ................ G02B 9/64 |
| 2021/0157092 | A1* | 5/2021 | Chen ................ G02B 27/0025 |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| KR | 1020140135909 A | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020220444 A1 | 11/2020 |
| WO | 2020258269 A1 | 12/2020 |
| WO | 2021026869 A1 | 2/2021 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184167 A1 | 9/2021 |
| WO | 2021203277 A1 | 10/2021 |

(56) References Cited

FOREIGN PATENT DOCUMENTS

| | | |
|---|---|---|
| WO | 2021217504 A1 | 11/2021 |
| WO | 2021217664 A1 | 11/2021 |

OTHER PUBLICATIONS

US Non-Provisional U.S. Appl. No. 17/606,027, 371 filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
US Non-Provisional U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
US Non-Provisional U.S. Appl. No. 17/606,359, 371 filed Oct. 25, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
US Non-Provisional U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
US Non-Provisional U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
US Non-Provisional U.S. Appl. No. 17/611,148, 371 filed Nov. 13, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
US Non-Provisional U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of Ofilm Group Co. Ltd.
US Non-Provisional U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
US Non-Provisional U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
US Non-Provisional U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
US Non-Provisional U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
US Non-Provisional U.S. Appl. No. 17/614,499, 371 filed Nov. 26, 2021, in the name of OFilm Group Co. Ltd. and Jiangxi Jingchao Optical Co. Ltd.
US Non-Provisional U.S. Appl. No. 17/536,006, filed date Nov. 27, 2021, in the name of Jiangxi Jingchao Optical Co. Ltd.
US Non-Provisional U.S. Appl. No. 17/536,010, filed Nov. 27, 2021, in the name of Jiangxi Jingchao Optical Co. Ltd.
International Search Report dated on Jan. 15, 2020 on International Patent Application PCT/CN2019/110525, filed Jan. 3, 2020, in the name of Jiangxi Jingchao Optical Co. Ltd.
US Non-Provisional U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
US Non-Provisional U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
US Non-Provisional U.S. Appl. No. 17/440,786, 371 filed Sep. 19, 2021, in the name of Jiangxi Jingchao Optical Co. Ltd.
US Non-Provisional U.S. Appl. No. 17/605,985, 371 filed 22 Octomber 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
US Non-Provisional U.S. Appl. No. 17/606,005, 371 Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
US Non-Provisional U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
US Non-Provisional U.S. Appl. No. 17/604,739, 371 filed Oct. 18, 2021, in the name of Jiangxi Jingchao Optical Co. Ltd.

* cited by examiner

OPTICAL SYSTEM, CAMERA MODULE, AND ELECTRONIC DEVICE

CROSS-REFERENCE TO RELATED APPLICATIONS

This application is a national stage, filed under 35 U.S.C. § 371, of International Patent Application No. PCT/CN2020/079517, entitled "OPTICAL SYSTEM, CAMERA MODULE, AND ELECTRONIC DEVICE", filed on 16 Mar. 2020, the contents of which are incorporated by reference herein in its entirety.

TECHNICAL FIELD

The present disclosure relates to relates to a camera field, in particular to an optical system, a camera module, and an electronic device.

BACKGROUND

In recent years, as camera lenses are applied to portable electronics such as smart phones, the performance of the camera lens also changes greatly with the increase of the user's demand for capturing quality. Theoretically, by configuring a plurality of lenses, a system can have more space and freedom to adjust an incident light path. This is one of the most efficient ways to improve the imaging quality of an optical system. However, how to well configure the performance of each of the lenses in the optical system to ensure the high capturing quality of the system is one of the main concerns of the current lens design.

SUMMARY

According to embodiments of the present disclosure, an optical system is provided.

An optical system includes, successively in order from an object side to an image side:

a first lens having a refractive power, an object side surface of the first lens being concave at a paraxial area thereof, and an image side surface of the first lens being convex at the paraxial area thereof;

a second lens having a positive refractive power, an object side surface of the second lens being convex at a paraxial area thereof, and an image side surface of the second lens being concave at the paraxial area thereof;

a third lens having a positive refractive power, and an image side surface of the third lens being convex at a paraxial area thereof;

a fourth lens having a negative refractive power, and an object side surface of the fourth lens being concave at a paraxial area thereof;

a fifth lens having a refractive power;

a sixth lens having a negative refractive power, and an object side surface of the sixth lens being concave at a paraxial area thereof;

a seventh lens having a positive refractive power, and an object side surface of the seventh lens being convex at a paraxial area thereof; and an eighth lens having a negative refractive power, an object side surface of the eighth lens being convex at a paraxial area thereof, and an image side surface of the eighth lens being concave at the paraxial area thereof.

A camera module includes a photosensitive element and the optical system as described above. The photosensitive element is arranged on an image side of the optical system.

An electronic device includes a fixing member and the camera module as described above. The camera module is provided on the fixing member.

Details of one or more embodiments of the present disclosure will be given in the following description and attached drawings. Other features, objects and advantages of the present disclosure will become apparent from the description, drawings, and claims.

BRIEF DESCRIPTION OF THE DRAWINGS

In order to better describe and illustrate the embodiments and/or examples of the contents disclosed herein, reference may be made to one or more drawings. Additional details or examples used to describe the drawings should not be considered as limiting the scope of any of the disclosed contents, the currently described embodiments and/or examples, and the best mode of these contents currently understood.

DETAILED DESCRIPTION OF THE EMBODIMENTS

Figure 1:
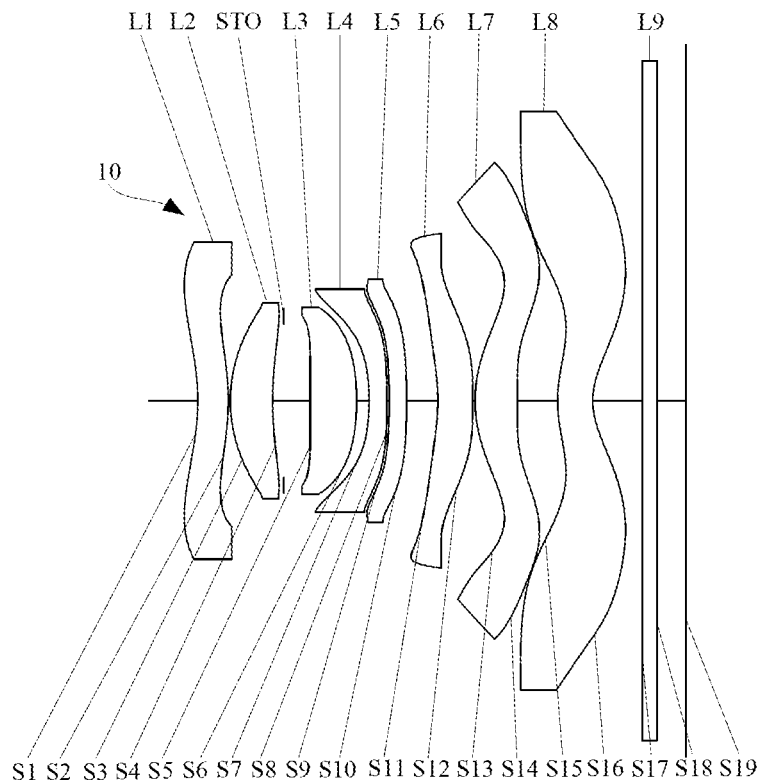
FIG. 1 is a schematic view of an optical system according to a first embodiment of the present disclosure.

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to make the disclosure of the present disclosure more thorough and comprehensive.

Referring to FIG. 1, in some embodiments of the present disclosure, the optical system 10 includes, successively in order from an object side to an image side, a first lens L1, a second lens L2, a stop STO, a third lens L3, a fourth lens L4, a fifth lens L5, a sixth lens L6, a seventh lens L7, and an eighth lens L8. The first lens L1 has a positive refractive power or a negative refractive power. The second lens L2 has a positive refractive power. The third lens L3 has a positive refractive power. The fourth lens L4 has a negative refractive power. The fifth lens L5 has a positive refractive power or a negative refractive power. The sixth lens L6 has a negative refractive power. The seventh lens L7 has a positive refractive power. The eighth lens L8 has a negative refractive power. The first lens L1 to the eighth lens L8 each contain only one lens, and the lenses in the optical system 10 are arranged coaxially with the stop STO. That is, an optical axis of each of the lenses and a center of the stop STO are on the same straight line. This straight line may be referred to as an optical axis of the optical system 10.

The first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. The fifth lens L5 includes an object side surface S9 and an image side surface S10. The sixth lens includes an object side surface S11 and an image side surface S12. The seventh lens includes an object side surface S13 and an image side surface S14. The eighth lens includes an object side surface S15 and an image side surface S16. In addition, the optical system 10 further has an imaging surface S19, which is located on an image side of the eighth lens. Generally, the imaging surface S19 of the optical system 10 overlaps a photosensitive surface of a photosensitive element. For ease of understanding, the imaging surface S19 can be regarded as the photosensitive surface of the photosensitive element.

In the above embodiment, the object side surface S1 of the first lens L1 is concave at a paraxial area thereof, and the image side surface S2 of the first lens L1 is convex at the paraxial area thereof. The object side surface S3 of the second lens L2 is convex at a paraxial area thereof, and the image side surface S4 of the second lens L2 is concave at the paraxial area thereof. The image side surface S6 of the third lens L3 is convex at a paraxial area thereof. The object side surface S7 of the fourth lens L4 is concave at a paraxial area thereof. The object side surface S11 of the sixth lens is concave at a paraxial area thereof. The object side surface S13 of the seventh lens is convex at a paraxial area thereof. The object side surface S15 of the eighth lens is convex at a paraxial area thereof, and the image side surface S16 of the eighth lens is concave at the paraxial area thereof.

In the above optical system 10, the second lens L2 have the positive refractive power, such that an ability of the system to correct aberrations can be effectively improved, and the sensitivity of the system can be reduced. By designing the object side surface S3 of the second lens L2 to be convex, the second lens L2 can bear more positive refractive power, and can effectively reduce the aberration of the entire system, reduce the sensitivity of the system, and improve the yield of the system, which is also beneficial to the subsequent processing and assembly of the structures. The image side surface S6 of the third lens L3 is designed to be convex, which can effectively cooperate with the first lens L1 and the second lens L2 to reduce the spherical aberration of the system and improve the aberration correction ability of the system. The object side surface S13 of the seventh lens L7 is designed to be convex, such that the seventh lens L7 can bear a reasonable positive refractive power to share part of the refractive power of the system, thus avoiding excessive concentration of the positive refractive power on the second lens L2 and the third lens L3. In addition, this can further cooperate with the negative refractive power of the fourth lens L4 and the positive refractive power of the seventh lens L7, which can facilitate the distribution of the refractive power of the entire system, avoid excessive concentration of refractive power, and further help balance the vertical chromatic aberration and lateral chromatic aberration of the system. By well configuring the refractive power and the surface shape relationship between the lenses, the above optical system 10 can have excellent capturing quality.

In the above embodiments, the object side surfaces and the image side surfaces of the first lens L1 to the eighth lens L8 are both aspherical, and the object side surface S15 and the image side surface S16 of the eighth lens L8 both have inflection points. The aspheric surface configuration can further help the optical system 10 to eliminate aberrations and solve the problem of distortion of the field of view. In addition, it is also beneficial to the miniaturized design of the optical system 10, such that the optical system 10 can have excellent optical effect while maintaining the miniaturized design. Of course, in other embodiments, the object side surface of any one of the first lens L1 to the eighth lens L8 can be spherical or aspherical, the image side surface of any one of the first lens L1 to the eighth lens L8 can be spherical or aspherical. Through the cooperation of the spherical surface and the aspheric surface, the aberration problem can also be effectively eliminated, such that the optical system 10 has an excellent imaging effect, while improving the flexibility of design and assembly of the lenses. In particular, when the eighth lens L8 is an aspherical lens, it is beneficial to finally correct the aberrations generated by the front lenses, such that it is beneficial to improve the imaging quality. It should be noted that the shape of the spherical or aspheric surface is not limited to the shape of the spherical or aspheric surface shown in the drawings. The drawings are for reference only and are not drawn strictly to scale.

The surface shape of the aspheric surface can be calculated by referring to the following aspheric formula:

$$Z = \frac{cr^2}{1+\sqrt{1-(k+1)c^2r^2}} + \sum_i Ai \, r^i$$

where, Z is a distance from a corresponding point on an aspheric surface to a plane tangent to a vertex of the surface, r is a distance from a corresponding point on the aspheric surface to the optical axis, c is a curvature of the vertex of the aspheric surface, k is a conic coefficient, and Ai is a coefficient corresponding to the $i^{th}$ high-order term in the aspheric surface shape formula.

In another aspect, when the object side surface or image side surface of a certain lens is aspherical, such surface can be overall convex or overall concave. Alternatively, such surface can also be designed to have a structure with inflection points. As such, the shape of the surface will change from its center to its edge. For example, the surface is convex at its center and is concave at its edge. It should be noted that when describing that a side surface of the lens at the optical axis (a central area of the side surface) is convex in an embodiment of the present disclosure, it can be understood that an area of this side surface of the lens at its paraxial area is convex. Therefore, it can also be determined that the side surface is convex at its paraxial area. When describing a side surface of the lens is concave at its circumference, it can be understood that an area of the side surface is concave when approaching the maximum effective radius. For example, when the side surface is convex at its paraxial area and is also convex at its circumference, a shape of the side surface in a direction from its center (the optical axis) to its edge may be completely convex, or may be first convex at its center and be then transitioned to be concave, and then become convex when approaching the maximum effective radius. These are only examples to illustrate various shapes and structures (concave-convex conditions) of the side surface at the optical axis and the circumference, and the various shapes and structures (concave-convex conditions) of the side surface are not fully described, but other situations can be derived from the above examples, and should be considered as contents disclosed in the present disclosure.

In the above embodiments, each of the lenses in the optical system 10 is made of plastic. Of course, in some embodiments, each of the lenses in the optical system 10 is made of glass. The lens made of plastic can reduce the weight of the optical system 10 and the manufacturing cost, while the lens made of glass can withstand higher temperatures and have excellent optical effects. In other embodiments, the first lens L1 is made of glass, and the second lens L2 to the eighth lens L8 are all made of plastic. In this case, since the lenses located on an object side in the optical system 10 are made of glass, the glass-made lenses located on the object side have a good resistance to extreme environments and are not susceptible to aging due to the impact of the environment on the object side. Therefore, when the optical system 10 is under the extreme environments such as exposed to the sun or in high temperature environment, this structure can effectively balance between the optical performance and cost of the system. Of course, the material configuration of the lenses in the optical system 10 is not limited to the above embodiments, and any lens may be made of plastic or glass.

In some embodiments, the optical system 10 includes an infrared cut-off filter L9. The infrared cut-off filter L9 is arranged on an image side of the eighth lens L8, and is fixedly arranged relative to each of the lenses in the optical system 10. The infrared cut-off filter L9 includes an object side surface S17 and an image side surface S18. The infrared cut-off filter L9 is used to filter out infrared light and prevent infrared light from reaching the imaging surface S19 of the system, thereby preventing the infrared light from interfering with normal imaging. The infrared cut-off filter L9 can be assembled with the lenses as a part of the optical system 10. In other embodiments, the infrared cut-off filter L9 is not a component of the optical system 10. In this case, when the optical system 10 and the photosensitive element are assembled into a camera module, the infrared cut-off filter L9 can be mounted between the optical system 10 and the photosensitive element. In some embodiments, the infrared cut-off filter L9 may also be arranged on the object side of the first lens L1. In addition, in some embodiments, the infrared cut-off filter L9 may be omitted, while a filter coating is provided on any one of the first lens L1 to the eighth lens L8 to achieve the effect of filtering the infrared light.

In other embodiments, the first lens L1 may also include two or more lenses. An object side surface of a lens closest to the object side is the object side surface S1 of the first lens L1, and an image side surface of a lens closest to the image side is the image side surface S2 of the first lens L1. Correspondingly, any one of the second lens L2, the third lens L3, the fourth lens L4, the fifth lens L5, the sixth lens L6, the seventh lens L7, and the eighth lens L8 in some embodiments is not limited to only include one lens.

In some embodiments, the optical system 10 further satisfies the following conditions:

TTL/Imgh<1.36; where TTL is a distance from the object side surface S1 of the first lens L1 to the imaging surface S19 of the optical system 10 on the optical axis, and Imgh is half of a diagonal length of an effective imaging area of the optical system 10 on the imaging surface S19. In some embodiments, the TTL/Imgh is equal to 1.290, 1.292, 1.295, 1.297, 1.299, or 1.30. When the above condition is satisfied, the optical system 10 can achieve a miniaturized design.

2<f/R16<4; where f is an effective focal length of the optical system 10, and R16 is a radius of curvature of the image side surface S16 of the eighth lens L8 at the optical axis. In some embodiments, the f/R16 is equal to 3.75, 3.78, 3.80, 3.82, 3.85, 3.87, or 3.89. When the above condition is satisfied, the effective focal length of the optical system 10 and the radius of curvature of the image side surface S16 of the eighth lens L8 can be reasonably configured, which is beneficial to reduce the main light angle on the imaging surface S19 of the system and improve the photosensitive efficiency of the photosensitive element when being assembled.

FNO≤2; where FNO is an f-number of the optical system 10. In some embodiments, the FNO is equal to 1.80, 1.82, 1.84, 1.86, or 1.88. When the above condition is satisfied, the optical system 10 has a large-aperture characteristic, so that the amount of incident light can be increased, the captured image is clearer, and the high-quality capturing of night scenes, starry sky and other scenes with low brightness can be achieved.

1<SD12/SD21<1.4; where SD12 is the maximum effective semiaperture of the image side surface S2 of the first lens L1, SD21 is the maximum effective semiaperture of the object side surface S3 of the second lens L2. In some embodiments, the SD12/SD21 is equal to 1.280, 1.283, 1.287, 1.290, 1.292, 1.295, 1.300, 1.305. When the above condition is satisfied, a size of the front end of the optical system 10 can be effectively reduced.

TTL/f<1.65; where TTL is the distance from the object side surface S1 of the first lens L1 to the imaging surface S19 of the optical system 10 on the optical axis, and f is the effective focal length of the optical system 10. In some embodiments, the TTL/f is equal to 1.58, 1.59, 1.60, or 1.61. When the above condition is satisfied, the optical system 10 can meet the requirements of the miniaturized design.

tan(HFOV)>1.09; where HFOV is half of the maximum angle of field of view of the optical system 10. In some embodiments, the tan(HFOV) is equal to 1.242, 1.244, 1.245, 1.247, or 1.249. When the above condition is satisfied, the optical system 10 can achieve a small wide-angle characteristic.

0<T23/CT3<0.9; where T23 is a distance from the image side surface S4 of the second lens L2 to the object side surface S5 of the third lens L3 on the optical axis, and CT3 is a thickness of the third lens L3 on the optical axis. In some embodiments, the T23/CT3 is equal to 0.803, 0.806, 0.810, 0.812, 0.815, or 0.818. When the above condition is satisfied, it is beneficial to reduce the deflection angle of the light in the system, thereby effectively reducing the sensitivity of the system.

Hereafter, the optical system 10 of the present disclosure will be described in more specific and detailed embodiments.

First Embodiment

Figure 2:
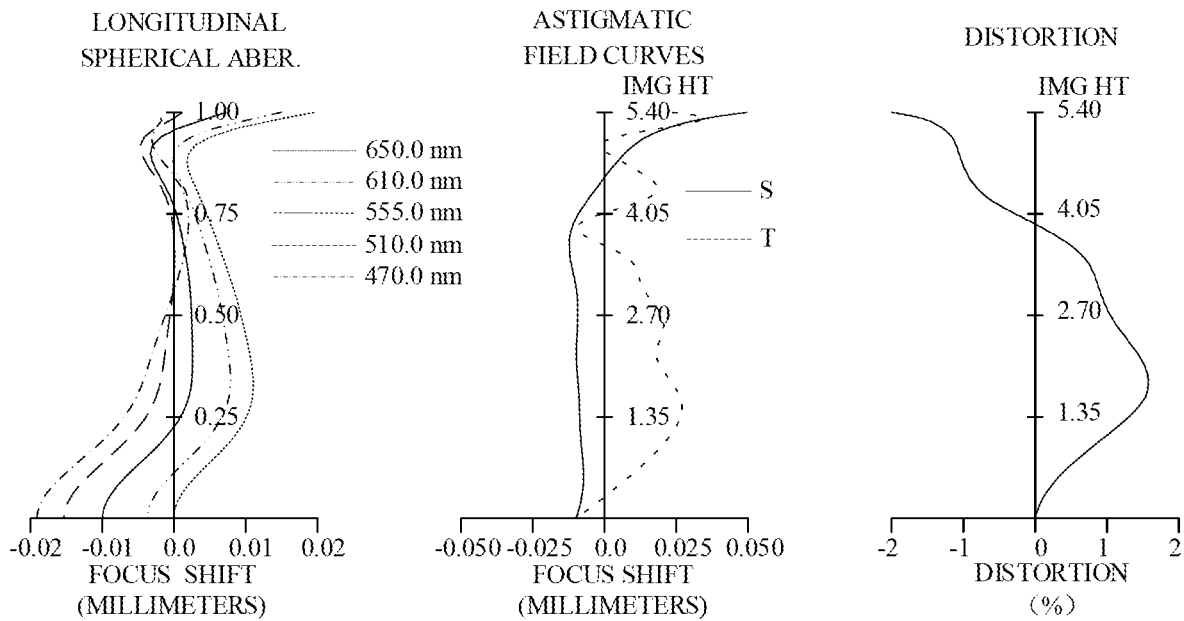
FIG. 2 is a graph showing longitudinal spherical aberration (mm), astigmatism (mm), and distortion (%) of the optical system according to the first embodiment.

Referring to FIGS. 1 and 2, in the first embodiment, the optical system 10 includes, successively in order from an object side to an image side, a first lens L1 having a negative refractive power, a second lens L2 having a positive refractive power, a stop STO, a third lens L3 having a positive refractive power, a fourth lens L4 having a negative refractive power, a fifth lens L5 having a positive refractive power, a sixth lens L6 having a negative refractive power, a seventh lens L7 having a positive refractive power, and an eighth lens L8 having a negative refractive power. A longitudinal spherical aberration diagram (mm), an astigmatism diagram (mm), and a distortion diagram (%) of the optical system 10 in the first embodiment is included in FIG. 2. The reference wavelength for astigmatism diagram and distortion diagram is 555 nm.

An object side surface S1 of the first lens L1 is concave at a paraxial area thereof, and an image side surface S2 of the first lens L1 is convex at the paraxial area thereof. the object side surface S1 is convex at a circumference thereof, and the image side surface S2 is concave at the circumference thereof.

An object side surface S3 of the second lens L2 is convex at a paraxial area thereof, and an image side surface S4 of the second lens L2 is concave at the paraxial area thereof. The object side surface S3 is concave at a circumference thereof, and the image side surface S4 is convex at the circumference thereof.

An object side surface S5 of the third lens L3 is convex at a paraxial area thereof, and an image side surface S6 of the third lens L3 is convex at the paraxial area thereof. the object side surface S5 is concave at a circumference thereof, and the image side surface S6 is convex at the circumference thereof.

An object side surface S7 of the fourth lens L4 is concave at a paraxial area thereof, and an image side surface S8 of the fourth lens L4 is convex at the paraxial area thereof. The object side surface S7 is convex at a circumference thereof, and the image side surface S8 is concave at the circumference thereof.

An object side surface S9 of the fifth lens L5 is concave at a paraxial area thereof, and an image side surface S10 of the fifth lens L5 is convex at the paraxial area thereof. The object side surface S9 is convex at a circumference thereof, and the image side surface S10 is concave at the circumference thereof.

An object side surface S11 of the sixth lens L6 is concave at a paraxial area thereof, and an image side surface S12 of the sixth lens L6 is convex at the paraxial area thereof. The object side surface S11 is convex at a circumference thereof, and the image side surface S12 is concave at the circumference thereof.

An object side surface S13 of the seventh lens L7 is convex at a paraxial area thereof, and an image side surface S14 of the seventh lens L7 is convex at the paraxial area thereof. The object side surface S13 is convex at a circumference thereof, and the image side surface S14 is convex at the circumference thereof.

An object side surface S15 of the eighth lens L8 is convex at a paraxial area thereof, and an image side surface S16 of the eighth lens L8 is concave at the paraxial area thereof. The object side surface S15 is concave at a circumference thereof, and the image side surface S16 is convex at the circumference thereof.

In the above optical system 10, the second lens L2 has the positive refractive power, such that the ability of the system to correct aberrations can be effectively improved, and the sensitivity of the system can be reduced. By designing the object side surface S3 of the second lens L2 to be convex, the second lens L2 can bear more positive refractive power, and can effectively reduce the aberration of the entire system, reduce the sensitivity of the system, and improve the yield of the system, which is also beneficial to the subsequent processing and assembly of the structures. The image side surface S6 of the third lens L3 is designed to be convex, which can effectively cooperate with the first lens L1 and the second lens L2 to reduce the spherical aberration of the system and improve the aberration correction ability of the system. The object side surface S13 of the seventh lens L7 is designed to be convex, such that the seventh lens L7 can bear a reasonable positive refractive power to share part of the refractive power of the system, avoiding excessive concentration of the positive refractive power on the second lens L2 and the third lens L3. In addition, this can further cooperate with the negative refractive power of the fourth lens L4 and the positive refractive power of the seventh lens L7, which will facilitate the distribution of the refractive power of the entire system, avoid excessive concentration of refractive power, and further help balance the vertical chromatic aberration and lateral chromatic aberration of the system. The above optical system 10 can have excellent capturing quality by well configuring the refractive power and the surface shape relationship between the lenses.

The object side surfaces and the image side surfaces of the first lens L1 to the eighth lens L8 are both aspherical, and the object side surface S15 and the image side surface S16 of the eighth lens L8 both have inflection points. By cooperating the aspheric surface shapes of each of the lenses in the optical system 10, the problem of distortion of the field of view of the optical system 10 can be effectively solved, and the lens can achieve excellent optical effects even when the lenses are small and thin. Therefore, the optical system 10 can have a smaller volume, which is beneficial to the miniaturized design of the optical system 10.

Each of the lenses in the optical system 10 is made of plastic. The use of the lenses made of plastic can reduce the manufacturing cost of the optical system 10.

In the first embodiment, the optical system 10 satisfies the following conditions:

TTL/Imgh=1.29; where TTL is a distance from the object side surface S1 of the first lens L1 to the imaging surface S19 of the optical system 10 on the optical axis, and Imgh is half of a diagonal length of an effective imaging area of the optical system 10 on the imaging surface S19. When the above condition is satisfied, the optical system 10 can achieve a miniaturized design.

f/R16=3.89; where f is an effective focal length of the optical system 10, and R16 is a radius of curvature of the image side surface S16 of the eighth lens L8 at the optical axis. When the above condition is satisfied, the effective focal length of the optical system 10 and the radius of curvature of the image side surface S16 of the eighth lens L8 can be reasonably configured, which is beneficial to reduce the main light angle on the imaging surface S19 of the system and improve photosensitive efficiency of a photosensitive element when being assembled.

FNO=1.85; where FNO is an f-number of the optical system 10. When the above condition is satisfied, the optical system 10 has a large-aperture characteristic, so that the amount of incident light can be increased, the captured image is clearer, and the high-quality capturing of night scenes, starry sky and other scenes with low brightness can be achieved.

SD12/SD21=1.287; where SD12 is the maximum effective semiaperture of the image side surface S2 of the first lens L1, SD21 is the maximum effective semiaperture of the object side surface S3 of the second lens L2. When the above condition is satisfied, a size of the front end of the optical system 10 can be effectively reduced.

TTL/f=1.59; where TTL is the distance from the object side surface S1 of the first lens L1 to the imaging surface S19 of the optical system 10 on the optical axis, and f is the effective focal length of the optical system 10. When the above condition is satisfied, the optical system 10 can meet the requirements of a miniaturized design.

tan(HFOV)=1.25; where HFOV is half of the maximum angle of field of view of the optical system 10. When the above condition is satisfied, the optical system 10 can achieve a small wide-angle characteristic.

T23/CT3=0.81; where T23 is a distance from the image side surface S4 of the second lens L2 to the object side surface S5 of the third lens L3 on the optical axis, and CT3 is a thickness of the third lens L3 on the optical axis. When the above condition is satisfied, it is beneficial to reduce the deflection angle of the light in the system, thereby effectively reducing the sensitivity of the system.

In addition, parameters of the lenses of the optical system 10 are shown in Table 1 and Table 2. Table 2 shows aspheric coefficients of the lenses in Table 1. In table 2, k is a conic coefficient, and Ai is a coefficient corresponding to the $i^{th}$ high-order term in the aspheric surface shape formula. The elements from the object surface to the image surface (the imaging surface 19, which can also be understood as a photosensitive surface of the photosensitive element when assembling in later) are arranged in the order of the elements in Table 1 from top to bottom. A subject located on the object surface can be clearly imaged on the imaging surface 19 of the optical system 10. The surface numbers 1 and 2 indicate the object side surface S1 and the image side surface S2 of the first lens L1, respectively. That is, in the same lens, the surface with the smaller surface number is the object side surface, and the surface with the larger surface number is the image side surface. The Y radius in Table 1 is the radius of curvature of the object side surface or image side surface indicated by corresponding surface number on the optical axis. In the "thickness" parameter column of a lens, the first value is the thickness of the lens on the optical axis, and the second value is a distance from the image side surface of the lens to the object side surface of the latter lens on the optical axis. The optical axis of each of the lenses are on the same straight line. This straight line may be referred to as the optical axis of the optical system 10. It should be noted that in the following embodiments, an infrared cut-off filter L9 may be or may be not an element in the optical system 10.

In the first embodiment, the effective focal length of the optical system 10 is indicated by f, and f=4.38 mm. The f-number is indicated by FNO, and FNO=1.85. The maximum angle of field of view (that is, a diagonal angle of field of view) is indicated by FOV, and FOV=102.9°. The total optical length is indicated by TTL, and TTL=6.95 mm.

In addition, in the following embodiments (the first embodiment to a sixth embodiment), the reference wavelength for the refractive index, the abbe number, and the focal lengths of each lens is 555 nm. In addition, the calculation of the conditions, and the structures of the lenses in each embodiment are based on the parameters of the lenses (such as parameters in Table 1, Table 2, Table 3, Table 4, etc.).

TABLE 1

First Embodiment
f = 4.38 mm, FNO = 1.85, FOV = 102.9°, TTL = 6.95 mm

| Surface Number | Surface Name | Surface Shape | Y radius (mm) | Thickness (mm) | Material | Refractive index | Abbe number | Focal Length (mm) |
|---|---|---|---|---|---|---|---|---|
|  | Object Surface | Spherical | Infinite | Infinite |  |  |  |  |
| 1 | First | Aspherical | −3.5729 | 0.4333 | Plastic | 1.54 | 55.75 | −133.19 |
| 2 | Lens | Aspherical | −3.9206 | 0.0300 |  |  |  |  |
| 3 | Second | Aspherical | 2.3689 | 0.6012 | Plastic | 1.54 | 55.75 | 7.58 |
| 4 | Lens | Aspherical | 5.1940 | 0.1610 |  |  |  |  |
|  | Stop | Spherical | 1.00E+18 | 0.3758 |  |  |  |  |
| 5 | Third | Aspherical | 61.8096 | 0.6600 | Plastic | 1.54 | 56.11 | 6.93 |
| 6 | Lens | Aspherical | −3.9979 | 0.1775 |  |  |  |  |
| 7 | Fourth | Aspherical | −3.7517 | 0.2558 | Plastic | 1.66 | 20.38 | −9.14 |
| 8 | Lens | Aspherical | −10.1765 | 0.0300 |  |  |  |  |
| 9 | Fifth | Aspherical | −12.1314 | 0.2500 | Plastic | 1.54 | 56.11 | 703.85 |
| 10 | Lens | Aspherical | −11.8443 | 0.4426 |  |  |  |  |
| 11 | Sixth | Aspherical | −3.5108 | 0.5000 | Plastic | 1.57 | 37.40 | −7.89 |
| 12 | Lens | Aspherical | −17.1340 | 0.0300 |  |  |  |  |
| 13 | Seventh | Aspherical | 2.0970 | 0.6060 | Plastic | 1.54 | 55.75 | 3.47 |
| 14 | Lens | Aspherical | −14.5673 | 0.5685 |  |  |  |  |
| 15 | Eighth | Aspherical | 2.1085 | 0.5020 | Plastic | 1.54 | 55.75 | −5.48 |
| 16 | Lens | Aspherical | 1.1249 | 0.7050 |  |  |  |  |
| 17 | Infrared | Spherical | Infinite | 0.2100 | Glass |  |  |  |
| 18 | Cut-off Filter | Spherical | Infinite | 0.4113 |  |  |  |  |
|  | Imaging Surface | Spherical | Infinite | 0.0000 |  |  |  |  |

Note:
the reference wavelength is 555 nm

TABLE 2

| Surface Number | 1 | 2 | 3 | 4 | 5 | 6 | 7 | 8 |
|---|---|---|---|---|---|---|---|---|
| K | −1.5111 | −6.1427 | −13.8745 | −7.6187 | 3.3628 | −1.8636 | −0.3653 | −8.2092 |
| A4 | 0.0363 | 0.0365 | 0.1187 | −0.0257 | −0.0172 | −0.0482 | −0.0598 | −0.0214 |
| A6 | −0.0099 | −0.0132 | −0.1125 | 0.0157 | −0.0079 | −0.0336 | −0.0601 | 0.0073 |
| A8 | 0.0039 | 0.0088 | 0.1082 | −0.0118 | 0.0045 | 0.0588 | 0.0870 | −0.0391 |
| A10 | −0.0010 | −0.0035 | −0.0772 | 0.0037 | −0.0134 | −0.0603 | −0.0762 | 0.0304 |
| A12 | 0.0002 | 0.0009 | 0.0365 | 0.0003 | 0.0122 | 0.0330 | 0.0405 | −0.0091 |
| A14 | 0.0000 | −0.0001 | −0.0100 | −0.0011 | −0.0067 | −0.0097 | −0.0110 | 0.0010 |
| A16 | 0.0000 | 0.0000 | 0.0011 | 0.0003 | 0.0011 | 0.0011 | 0.0012 | 0.0000 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

| Surface Number | 9 | 10 | 11 | 12 | 13 | 14 | 15 | 16 |
|---|---|---|---|---|---|---|---|---|
| K | 2.5029 | −9.5128 | −22.7856 | −27.6029 | −6.9216 | −23.6470 | −3.8168 | −3.0788 |
| A4 | −0.0431 | −0.0223 | −0.0077 | −0.1574 | 0.0305 | 0.1982 | −0.1119 | −0.0733 |
| A6 | 0.0754 | 0.0216 | 0.0475 | 0.1096 | −0.0041 | −0.1121 | 0.0258 | 0.0226 |
| A8 | −0.1436 | −0.0467 | −0.0498 | −0.0496 | −0.0100 | 0.0346 | −0.0040 | −0.0052 |
| A10 | 0.1203 | 0.0395 | 0.0266 | 0.0152 | 0.0049 | −0.0071 | 0.0006 | 0.0008 |
| A12 | −0.0517 | −0.0167 | −0.0084 | −0.0029 | −0.0011 | 0.0010 | −0.0001 | −0.0001 |
| A14 | 0.0113 | 0.0034 | 0.0016 | 0.0003 | 0.0001 | −0.0001 | 0.0000 | 0.0000 |
| A16 | −0.0010 | −0.0003 | −0.0002 | 0.0000 | 0.0000 | 0.0000 | 0.0000 | 0.0000 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

Second Embodiment

Figure 3:
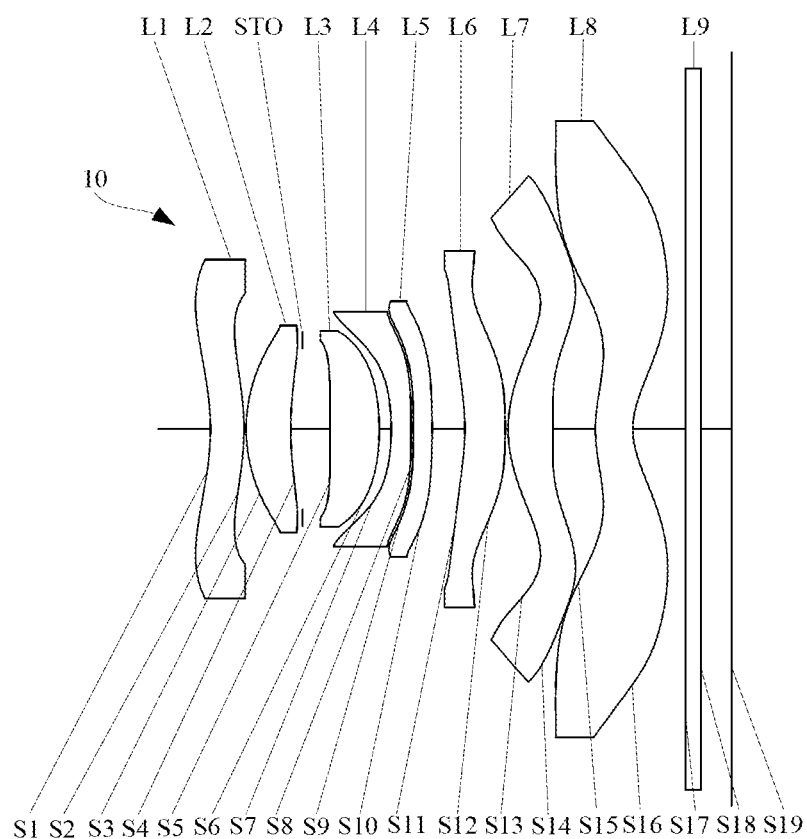
FIG. 3 is a schematic view of an optical system according to a second embodiment of the present disclosure.
Figure 4:
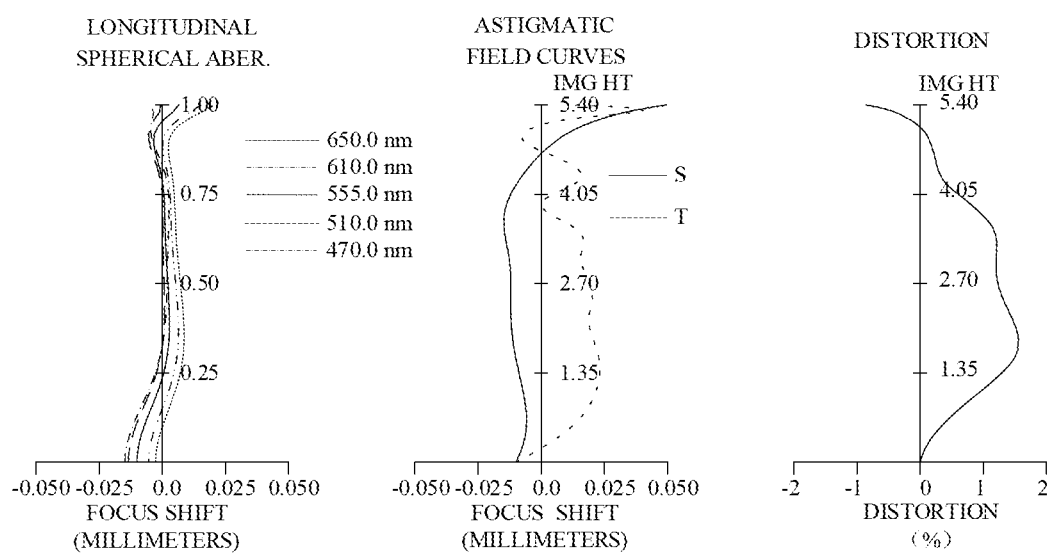
FIG. 4 is a graph showing longitudinal spherical aberration (mm), astigmatism (mm), and distortion (%) of the optical system according to the second embodiment.

Referring to FIGS. 3 and 4, in the second embodiment, the optical system 10 includes, successively in order from an object side to an image side, a first lens L1 having a positive refractive power, a second lens L2 having a positive refractive power, a stop STO, a third lens L3 having a positive refractive power, a fourth lens L4 having a negative refractive power, a fifth lens L5 having a negative refractive power, a sixth lens L6 having a negative refractive power, a seventh lens L7 having a positive refractive power, and an eighth lens L8 having a negative refractive power. A longitudinal spherical aberration diagram (mm), an astigmatism diagram (mm), and a distortion diagram (%) of the optical system 10 in the second embodiment is included in FIG. 4. The astigmatism diagram and the distortion diagram are graphs at a wavelength of 555 nm.

An object side surface S1 of the first lens L1 is concave at a paraxial area thereof, and an image side surface S2 of the first lens L1 is convex at the paraxial area thereof. the object side surface S1 is convex at a circumference thereof, and the image side surface S2 is concave at the circumference thereof.

An object side surface S3 of the second lens L2 is convex at a paraxial area thereof, and an image side surface S4 of the second lens L2 is concave at the paraxial area thereof. The object side surface S3 is concave at a circumference thereof, and the image side surface S4 is convex at the circumference thereof.

An object side surface S5 of the third lens L3 is concave at a paraxial area thereof, and an image side surface S6 of the third lens L3 is convex at the paraxial area thereof. The object side surface S5 is concave at a circumference thereof, and the image side surface S6 is convex at the circumference thereof.

An object side surface S7 of the fourth lens L4 is concave at a paraxial area thereof, and an image side surface S8 of the fourth lens L4 is convex at the paraxial area thereof. The object side surface S7 is convex at a circumference thereof, and the image side surface S8 is concave at the circumference thereof.

An object side surface S9 of the fifth lens L5 is concave at a paraxial area thereof, and an image side surface S10 of the fifth lens L5 is convex at the paraxial area thereof. The object side surface S9 is convex at a circumference thereof, and the image side surface S10 is concave at the circumference thereof.

An object side surface S11 of the sixth lens L6 is concave at a paraxial area thereof, and an image side surface S12 of the sixth lens L6 is convex at the paraxial area thereof. The object side surface S11 is concave at a circumference thereof, and the image side surface S12 is convex at the circumference thereof.

An object side surface S13 of the seventh lens L7 is convex at a paraxial area thereof, and an image side surface S14 of the seventh lens L7 is convex at the paraxial area thereof. The object side surface S13 is convex at a circumference thereof, and the image side surface S14 is convex at the circumference thereof.

An object side surface S15 of the eighth lens L8 is convex at a paraxial area thereof, and an image side surface S16 of the eighth lens L8 is concave at the paraxial area thereof. The object side surface S15 is concave at a circumference thereof, and the image side surface S16 is convex at the circumference thereof.

In addition, various parameters of the lenses of the optical system 10 in the second embodiment are shown in Table 3 and Table 4. Definitions of the various structures and parameters can be obtained from the first embodiment, and which will not be repeated herein.

TABLE 3

Second Embodiment
f = 4.38 mm, FNO = 1.85, FOV = 102.3°, TTL = 7 mm

| Surface Number | Surface Name | Surface Shape | Y radius (mm) | Thickness (mm) | Material | Refractive index | Abbe number | Focal Length (mm) |
|---|---|---|---|---|---|---|---|---|
|  | Object Surface | Spherical | Infinite | Infinite |  |  |  |  |
| 1 | First Lens | Aspherical | −3.8084 | 0.4505 | Plastic | 1.54 | 55.75 | 256.67 |
| 2 |  | Aspherical | −3.8584 | 0.0300 |  |  |  |  |
| 3 | Second Lens | Aspherical | 2.4191 | 0.5980 | Plastic | 1.54 | 55.75 | 8.09 |
| 4 |  | Aspherical | 5.0111 | 0.1616 |  |  |  |  |
|  | Stop | Spherical | 1.00E+18 | 0.3671 |  |  |  |  |
| 5 | Third Lens | Aspherical | −998.00 | 0.6600 | Plastic | 1.54 | 56.11 | 6.55 |
| 6 |  | Aspherical | −3.5519 | 0.1605 |  |  |  |  |
| 7 | Fourth Lens | Aspherical | −3.6541 | 0.2674 | Plastic | 1.66 | 20.38 | −8.00 |
| 8 |  | Aspherical | −12.1772 | 0.0310 |  |  |  |  |
| 9 | Fifth Lens | Aspherical | −12.7644 | 0.2500 | Plastic | 1.54 | 56.11 | −2067.26 |
| 10 |  | Aspherical | −13.0000 | 0.4403 |  |  |  |  |
| 11 | Sixth Lens | Aspherical | −3.4759 | 0.5401 | Plastic | 1.57 | 37.40 | −7.59 |
| 12 |  | Aspherical | −19.0955 | 0.0410 |  |  |  |  |
| 13 | Seventh Lens | Aspherical | 2.0054 | 0.6060 | Plastic | 1.54 | 55.75 | 3.21 |
| 14 |  | Aspherical | −10.5888 | 0.5664 |  |  |  |  |
| 15 | Eighth Lens | Aspherical | 2.3829 | 0.5020 | Plastic | 1.54 | 55.75 | −4.99 |
| 16 |  | Aspherical | 1.1661 | 0.7068 |  |  |  |  |
| 17 | Infrared Cut-off Filter | Spherical | Infinite | 0.2100 | Glass |  |  |  |
| 18 |  | Spherical | Infinite | 0.4113 |  |  |  |  |
|  | Imaging Surface | Spherical | Infinite | 0.000 |  |  |  |  |

Note:
the reference wavelength is 555 nm

TABLE 4

| Surface Number | 1 | 2 | 3 | 4 | 5 | 6 | 7 | 8 |
|---|---|---|---|---|---|---|---|---|
| K | −1.1501 | −5.1201 | −13.5050 | −8.2433 | 10.0000 | −2.1535 | −0.2855 | 7.0696 |
| A4 | 0.0291 | 0.0345 | 0.1131 | −0.0254 | −0.0191 | −0.0469 | −0.0623 | −0.0077 |
| A6 | −0.0061 | −0.0135 | −0.1010 | 0.0145 | −0.0061 | −0.0223 | −0.0200 | −0.0487 |
| A8 | 0.0022 | 0.0094 | 0.0951 | −0.0113 | 0.0003 | 0.0351 | 0.0087 | 0.0374 |
| A10 | −0.0005 | −0.0041 | −0.0682 | 0.0051 | −0.0095 | −0.0399 | −0.0156 | −0.0237 |
| A12 | 0.0001 | 0.0012 | 0.0332 | −0.0020 | 0.0103 | 0.0235 | 0.0175 | 0.0119 |
| A14 | 0.0000 | −0.0002 | −0.0095 | 0.0001 | −0.0067 | −0.0076 | −0.0066 | −0.0032 |
| A16 | 0.0000 | 0.0000 | 0.0011 | 0.0001 | 0.0013 | 0.0010 | 0.0008 | 0.0004 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

| Surface Number | 9 | 10 | 11 | 12 | 13 | 14 | 15 | 16 |
|---|---|---|---|---|---|---|---|---|
| K | 5.8084 | −6.8313 | −25.6596 | −22.7983 | −8.2157 | −23.6470 | −3.7493 | −3.2138 |
| A4 | −0.0005 | 0.0128 | 0.0101 | −0.1639 | 0.0354 | 0.1989 | −0.1039 | −0.0652 |
| A6 | −0.1006 | −0.0674 | 0.0217 | 0.1143 | −0.0057 | −0.1095 | 0.0225 | 0.0187 |
| A8 | 0.0964 | 0.0456 | −0.0307 | −0.0512 | −0.0088 | 0.0329 | −0.0033 | −0.0041 |
| A10 | −0.0400 | −0.0095 | 0.0182 | 0.0154 | 0.0043 | −0.0066 | 0.0005 | 0.0006 |
| A12 | 0.0057 | −0.0026 | −0.0061 | −0.0028 | −0.0010 | 0.0009 | −0.0001 | −0.0001 |
| A14 | 0.0006 | 0.0014 | 0.0012 | 0.0003 | 0.0001 | −0.0001 | 0.0000 | 0.0000 |
| A16 | −0.0002 | −0.0002 | −0.0001 | 0.0000 | 0.0000 | 0.0000 | 0.0000 | 0.0000 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

In this embodiment, the optical system 10 satisfies the following conditions.

| Second Embodiment | | | |
|---|---|---|---|
| TTL/Imgh | 1.30 | TTL/f | 1.60 |
| f/R16 | 3.76 | tan(HFOV) | 1.24 |
| SD12/SD21 | 1.308 | T23/CT3 | 0.80 |

Third Embodiment

Figure 5:
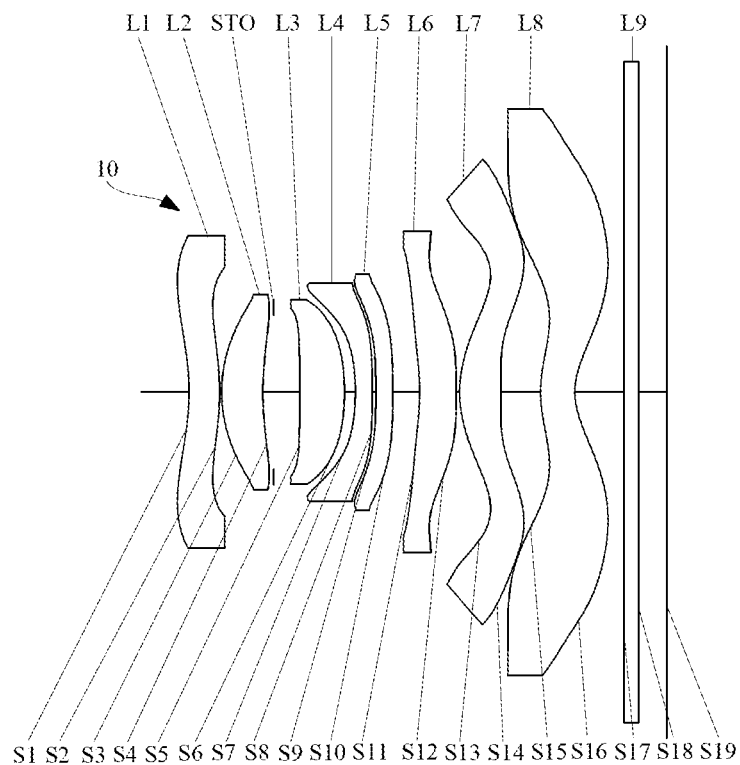
FIG. 5 is a schematic view of an optical system according to a third embodiment of the present disclosure.
Figure 6:
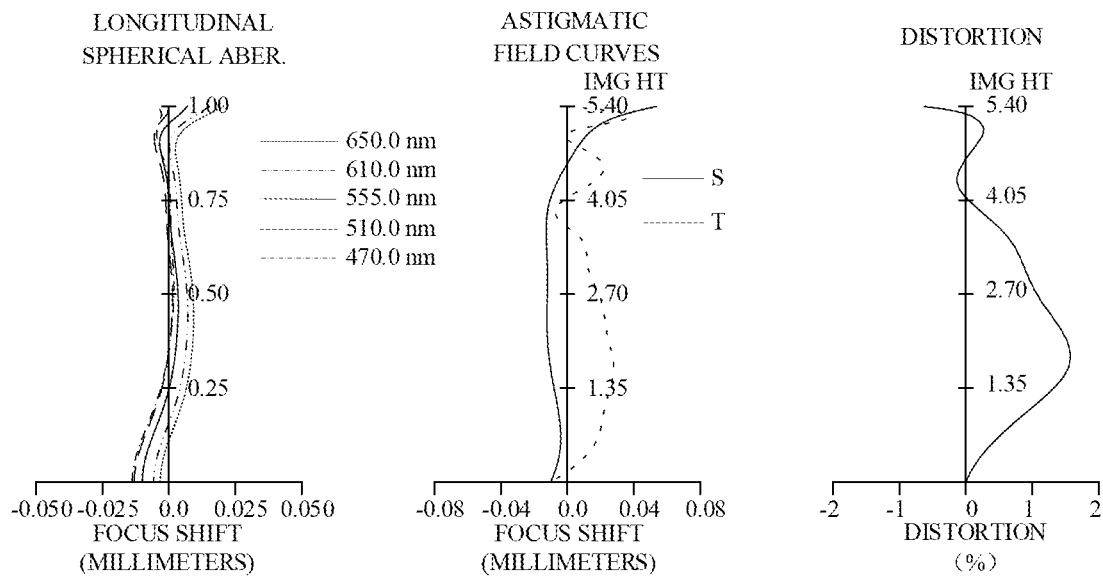
FIG. 6 is a graph showing longitudinal spherical aberration (mm), astigmatism (mm), and distortion (%) of the optical system according to the third embodiment.

Referring to FIGS. 5 and 6, in the third embodiment, the optical system 10 includes, successively in order from an object side to an image side, a first lens L1 having a negative refractive power, a second lens L2 having a positive refractive power, a stop STO, a third lens L3 having a positive refractive power, a fourth lens L4 having a negative refractive power, a fifth lens L5 having a positive refractive power, a sixth lens L6 having a negative refractive power, a seventh lens L7 having a positive refractive power, and an eighth lens L8 having a negative refractive power. A longitudinal spherical aberration diagram (mm), an astigmatism diagram (mm), and a distortion diagram (%) of the optical system 10 in the third embodiment is included in FIG. 6. The astigmatism diagram and the distortion diagram are graphs at a wavelength of 555 nm.

An object side surface S1 of the first lens L1 is concave at a paraxial area thereof, and an image side surface S2 of the first lens L1 is convex at the paraxial area thereof. the object side surface S1 is convex at a circumference thereof, and the image side surface S2 is concave at the circumference thereof.

An object side surface S3 of the second lens L2 is convex at a paraxial area thereof, and an image side surface S4 of the second lens L2 is concave at the paraxial area thereof. The object side surface S3 is concave at a circumference thereof, and the image side surface S4 is convex at the circumference thereof.

An object side surface S5 of the third lens L3 is convex at a paraxial area thereof, and an image side surface S6 of the third lens L3 is convex at the paraxial area thereof. the object side surface S5 is concave at a circumference thereof, and the image side surface S6 is convex at the circumference thereof.

An object side surface S7 of the fourth lens L4 is concave at a paraxial area thereof, and an image side surface S8 of the fourth lens L4 is convex at the paraxial area thereof. The object side surface S7 is convex at a circumference thereof, and the image side surface S8 is concave at the circumference thereof.

An object side surface S9 of the fifth lens L5 is concave at a paraxial area thereof, and an image side surface S10 of the fifth lens L5 is convex at the paraxial area thereof. The object side surface S9 is convex at a circumference thereof, and the image side surface S10 is concave at the circumference thereof.

An object side surface S11 of the sixth lens L6 is concave at a paraxial area thereof, and an image side surface S12 of the sixth lens L6 is convex at the paraxial area thereof. The object side surface S11 is concave at a circumference thereof, and the image side surface S12 is convex at the circumference thereof.

An object side surface S13 of the seventh lens L7 is convex at a paraxial area thereof, and an image side surface S14 of the seventh lens L7 is convex at the paraxial area thereof. The object side surface S13 is convex at a circumference thereof, and the image side surface S14 is convex at the circumference thereof.

An object side surface S15 of the eighth lens L8 is convex at a paraxial area thereof, and an image side surface S16 of the eighth lens L8 is concave at the paraxial area thereof. The object side surface S15 is concave at a circumference thereof, and the image side surface S16 is concave at the circumference thereof.

In addition, various parameters of the lenses of the optical system 10 in the third embodiment are shown in Table 5 and Table 6. Definitions of the various structures and parameters can be obtained from the first embodiment, and which will not be repeated herein.

TABLE 5

Third Embodiment
f = 4.36 mm, FNO = 1.78, FOV = 102.4°, TTL = 7 mm

| Surface Number | Surface Name | Surface Shape | Y radius (mm) | Thickness (mm) | Material | Refractive index | Abbe number | Focal Length (mm) |
|---|---|---|---|---|---|---|---|---|
| | Object Surface | Spherical | Infinite | Infinite | | | | |
| 1 | First | Aspherical | −3.8389 | 0.4479 | Plastic | 1.54 | 55.75 | −131.79 |
| 2 | Lens | Aspherical | −4.2251 | 0.0300 | | | | |
| 3 | Second | Aspherical | 2.3789 | 0.6046 | Plastic | 1.54 | 55.75 | 7.73 |
| 4 | Lens | Aspherical | 5.1029 | 0.1607 | | | | |
| | Stop | Spherical | 1.00E+18 | 0.3744 | | | | |
| 5 | Third | Aspherical | 95.3192 | 0.6600 | Plastic | 1.54 | 56.11 | 6.79 |
| 6 | Lens | Aspherical | −3.8311 | 0.1595 | | | | |
| 7 | Fourth | Aspherical | −3.8152 | 0.2506 | Plastic | 1.66 | 20.38 | −8.07 |
| 8 | Lens | Aspherical | −13.7557 | 0.0496 | | | | |
| 9 | Fifth | Aspherical | −13.9199 | 0.2512 | Plastic | 1.54 | 56.11 | 75.57 |
| 10 | Lens | Aspherical | −10.4655 | 0.3910 | | | | |
| 11 | Sixth | Aspherical | −4.0690 | 0.5357 | Plastic | 1.57 | 37.40 | −7.14 |
| 12 | Lens | Aspherical | 995.0000 | 0.0502 | | | | |
| 13 | Seventh | Aspherical | 1.9916 | 0.6060 | Plastic | 1.54 | 55.75 | 3.28 |
| 14 | Lens | Aspherical | −13.2994 | 0.5801 | | | | |
| 15 | Eighth | Aspherical | 2.1273 | 0.5032 | Plastic | 1.54 | 55.75 | −5.56 |
| 16 | Lens | Aspherical | 1.1382 | 0.7240 | | | | |
| 17 | Infrared | Spherical | Infinite | 0.2100 | Glass | | | |
| 18 | Cut-off Filter | Spherical | Infinite | 0.4113 | | | | |
| | Imaging Surface | Spherical | Infinite | 0.0000 | | | | |

Note:
the reference wavelength is 555 nm

TABLE 6

| Surface Number | 1 | 2 | 3 | 4 | 5 | 6 | 7 | 8 |
|---|---|---|---|---|---|---|---|---|
| K | −1.4003 | −6.3932 | −13.6476 | −7.8716 | 10.0000 | −3.2982 | −0.9043 | −3.2739 |
| A4 | 0.0359 | 0.0359 | 0.1139 | −0.0260 | −0.0186 | −0.0437 | −0.0534 | −0.0285 |
| A6 | −0.0098 | −0.0115 | −0.1081 | 0.0183 | −0.0021 | −0.0269 | −0.0211 | 0.0027 |
| A8 | 0.0037 | 0.0069 | 0.1060 | −0.0190 | −0.0071 | 0.0405 | 0.0216 | −0.0089 |
| A10 | −0.0010 | −0.0024 | −0.0776 | 0.0136 | 0.0028 | −0.0413 | −0.0393 | −0.0012 |
| A12 | 0.0002 | 0.0005 | 0.0373 | −0.0071 | −0.0002 | 0.0226 | 0.0356 | 0.0056 |
| A14 | 0.0000 | −0.0001 | −0.0102 | 0.0018 | −0.0016 | −0.0066 | −0.0133 | −0.0023 |
| A16 | 0.0000 | 0.0000 | 0.0011 | −0.0002 | 0.0004 | 0.0007 | 0.0018 | 0.0003 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

| Surface Number | 9 | 10 | 11 | 12 | 13 | 14 | 15 | 16 |
|---|---|---|---|---|---|---|---|---|
| K | 6.6844 | −12.4040 | −27.6114 | −27.8830 | −6.8018 | −23.6470 | −3.9038 | −3.0265 |
| A4 | −0.0230 | 0.0195 | 0.0142 | −0.1737 | 0.0271 | 0.1997 | −0.0980 | −0.0673 |
| A6 | −0.0434 | −0.0538 | 0.0303 | 0.1229 | 0.0022 | −0.1084 | 0.0194 | 0.0191 |
| A8 | 0.0284 | 0.0115 | −0.0417 | −0.0541 | −0.0128 | 0.0319 | −0.0025 | −0.0041 |
| A10 | 0.0049 | 0.0173 | 0.0237 | 0.0152 | 0.0055 | −0.0062 | 0.0004 | 0.0006 |
| A12 | −0.0105 | −0.0125 | −0.0075 | −0.0025 | −0.0012 | 0.0008 | 0.0000 | −0.0001 |
| A14 | 0.0036 | 0.0031 | 0.0014 | 0.0002 | 0.0001 | −0.0001 | 0.0000 | 0.0000 |
| A16 | −0.0004 | −0.0003 | −0.0001 | 0.0000 | 0.0000 | 0.0000 | 0.0000 | 0.0000 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

In this embodiment, the optical system 10 satisfies the following conditions.

| Third Embodiment | | | |
|---|---|---|---|
| TTL/Imgh | 1.30 | TTL/f | 1.61 |
| f/R16 | 3.83 | tan(HFOV) | 1.24 |
| SD12/SD21 | 1.276 | T23/CT3 | 0.81 |

Fourth Embodiment

Figure 7:
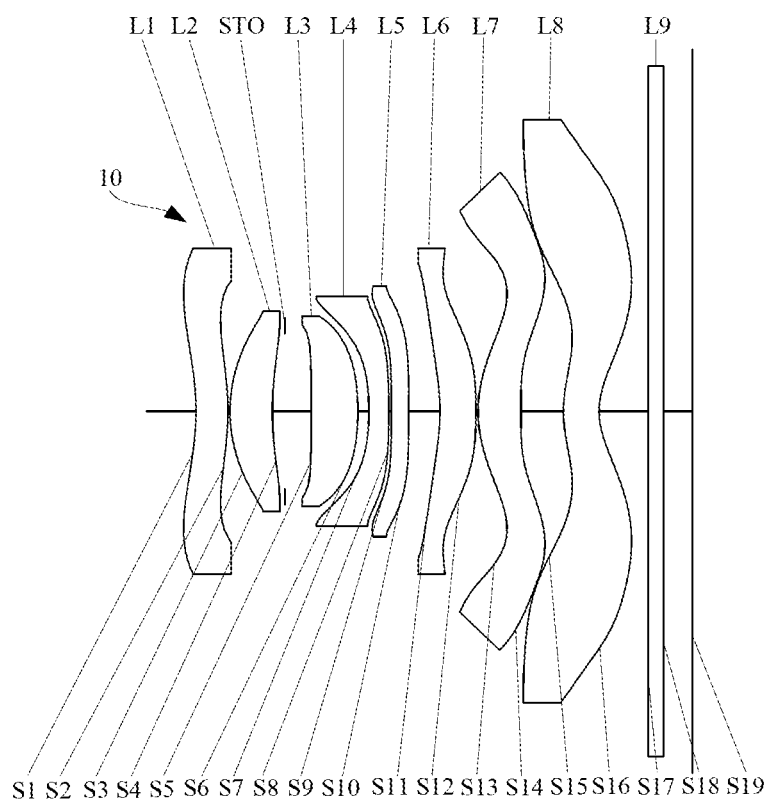
FIG. 7 is a schematic view of an optical system according to a fourth embodiment of the present disclosure.
Figure 8:
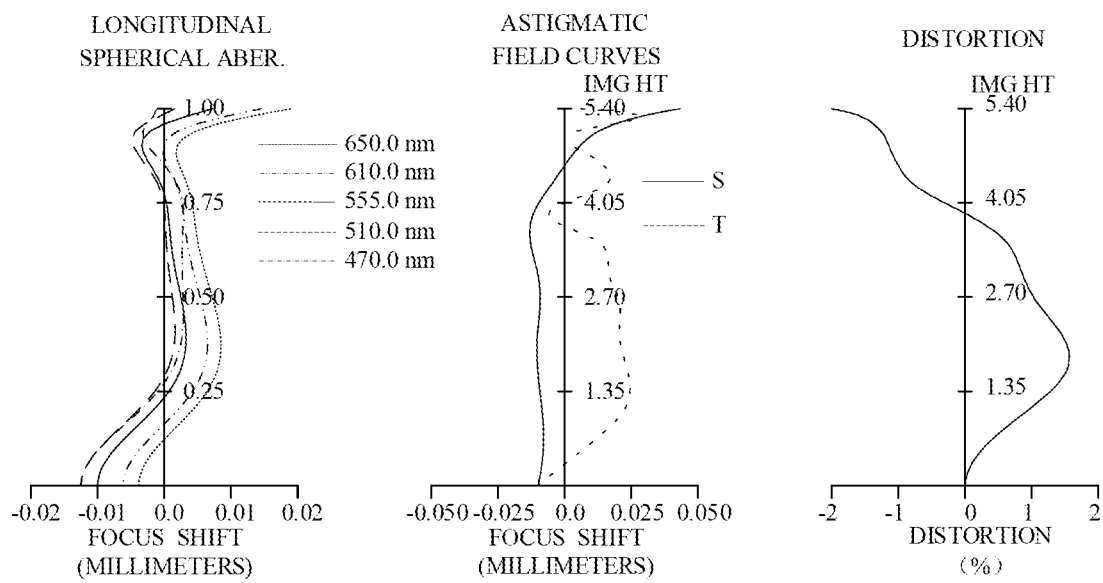
FIG. 8 is a graph showing longitudinal spherical aberration (mm), astigmatism (mm), and distortion (%) of the optical system according to the fourth embodiment.

Referring to FIGS. 7 and 8, in the fourth embodiment, the optical system 10 includes, successively in order from an object side to an image side, a first lens L1 having a negative refractive power, a second lens L2 having a positive refractive power, a stop STO, a third lens L3 having a positive refractive power, a fourth lens L4 having a negative refractive power, a fifth lens L5 having a positive refractive power, a sixth lens L6 having a negative refractive power, a seventh lens L7 having a positive refractive power, and an eighth lens L8 having a negative refractive power. A longitudinal spherical aberration diagram (mm), an astigmatism diagram (mm), and a distortion diagram (%) of the optical system 10 in the fourth embodiment is included in FIG. 8. The astigmatism diagram and the distortion diagram are graphs at a wavelength of 555 nm.

An object side surface S1 of the first lens L1 is concave at a paraxial area thereof, and an image side surface S2 of the first lens L1 is convex at the paraxial area thereof. the object side surface S1 is convex at a circumference thereof, and the image side surface S2 is concave at the circumference thereof.

An object side surface S3 of the second lens L2 is convex at a paraxial area thereof, and an image side surface S4 of the second lens L2 is concave at the paraxial area thereof. The object side surface S3 is concave at a circumference thereof, and the image side surface S4 is convex at the circumference thereof.

An object side surface S5 of the third lens L3 is convex at a paraxial area thereof, and an image side surface S6 of the third lens L3 is convex at the paraxial area thereof. the object side surface S5 is concave at a circumference thereof, and the image side surface S6 is convex at the circumference thereof.

An object side surface S7 of the fourth lens L4 is concave at a paraxial area thereof, and an image side surface S8 of the fourth lens L4 is convex at the paraxial area thereof. The object side surface S7 is convex at a circumference thereof, and the image side surface S8 is concave at the circumference thereof.

An object side surface S9 of the fifth lens L5 is convex at a paraxial area thereof, and an image side surface S10 of the fifth lens L5 is convex at the paraxial area thereof. The object side surface S9 is convex at a circumference thereof, and the image side surface S10 is concave at the circumference thereof.

An object side surface S11 of the sixth lens L6 is concave at a paraxial area thereof, and an image side surface S12 of the sixth lens L6 is convex at the paraxial area thereof. The object side surface S11 is concave at a circumference thereof, and the image side surface S12 is convex at the circumference thereof.

An object side surface S13 of the seventh lens L7 is convex at a paraxial area thereof, and an image side surface S14 of the seventh lens L7 is concave at the paraxial area thereof. The object side surface S13 is convex at a circumference thereof, and the image side surface S14 is convex at the circumference thereof.

An object side surface S15 of the eighth lens L8 is convex at a paraxial area thereof, and an image side surface S16 of the eighth lens L8 is concave at the paraxial area thereof. The object side surface S15 is convex at a circumference thereof, and the image side surface S16 is concave at the circumference thereof.

In addition, various parameters of the lenses of the optical system 10 in the fourth embodiment are shown in Table 7 and Table 8. Definitions of the various structures and parameters can be obtained from the first embodiment, and which will not be repeated herein.

TABLE 7

Fourth Embodiment
f = 4.41 mm, FNO = 1.85, FOV = 102.6°, TTL = 7 mm

| Surface Number | Surface Name | Surface Shape | Y radius (mm) | Thickness (mm) | Material | Refractive index | Abbe number | Focal Length (mm) |
|---|---|---|---|---|---|---|---|---|
| | Object Surface | Spherical | Infinite | Infinite | | | | |
| 1 | First Lens | Aspherical | -3.9715 | 0.4500 | Plastic | 1.54 | 55.75 | -166.72 |
| 2 | | Aspherical | -4.3207 | 0.0300 | | | | |
| 3 | Second Lens | Aspherical | 2.3649 | 0.5980 | Plastic | 1.54 | 55.75 | 7.84 |
| 4 | | Aspherical | 4.9463 | 0.1724 | | | | |
| | Stop | Spherical | 1.00E+18 | 0.3714 | | | | |
| 5 | Third Lens | Aspherical | 74.8712 | 0.6600 | Plastic | 1.54 | 56.11 | 6.91 |
| 6 | | Aspherical | -3.9439 | 0.1567 | | | | |
| 7 | Fourth Lens | Aspherical | -3.8058 | 0.2793 | Plastic | 1.66 | 20.38 | -7.60 |
| 8 | | Aspherical | -16.1443 | 0.0340 | | | | |
| 9 | Fifth Lens | Aspherical | 998.0000 | 0.2500 | Plastic | 1.54 | 56.11 | 35.51 |
| 10 | | Aspherical | -19.6985 | 0.4376 | | | | |
| 11 | Sixth Lens | Aspherical | -3.3201 | 0.5064 | Plastic | 1.57 | 37.40 | -8.17 |
| 12 | | Aspherical | -12.3666 | 0.0300 | | | | |
| 13 | Seventh Lens | Aspherical | 1.9697 | 0.6060 | Plastic | 1.54 | 55.75 | 3.69 |
| 14 | | Aspherical | 995.0000 | 0.5982 | | | | |
| 15 | Eighth Lens | Aspherical | 2.0415 | 0.5020 | Plastic | 1.54 | 55.75 | -5.91 |
| 16 | | Aspherical | 1.1344 | 0.6967 | | | | |
| 17 | Infrared Cut-off Filter | Spherical | Infinite | 0.2100 | Glass | | | |
| 18 | | Spherical | Infinite | 0.4113 | | | | |
| | Imaging Surface | Spherical | Infinite | 0.0000 | | | | |

Note:
the reference wavelength is 555 nm

TABLE 8

| Surface Number | 1 | 2 | 3 | 4 | 5 | 6 | 7 | 8 |
|---|---|---|---|---|---|---|---|---|
| K | -1.1630 | -5.5948 | -12.1402 | -6.8019 | 10.0000 | -1.7205 | -0.9802 | 7.5960 |
| A4 | 0.0336 | 0.0355 | 0.1040 | -0.0235 | -0.0201 | -0.0533 | -0.0689 | -0.0368 |
| A6 | -0.0088 | -0.0126 | -0.0878 | 0.0137 | -0.0045 | -0.0159 | 0.0076 | 0.0123 |
| A8 | 0.0033 | 0.0078 | 0.0791 | -0.0111 | -0.0042 | 0.0286 | -0.0131 | -0.0169 |
| A10 | -0.0008 | -0.0031 | -0.0548 | 0.0050 | -0.0019 | -0.0330 | -0.0004 | 0.0055 |
| A12 | 0.0001 | 0.0008 | 0.0259 | -0.0017 | 0.0033 | 0.0191 | 0.0077 | 0.0016 |
| A14 | 0.0000 | -0.0001 | -0.0073 | 0.0000 | -0.0027 | -0.0057 | -0.0034 | -0.0011 |
| A16 | 0.0000 | 0.0000 | 0.0009 | 0.0001 | 0.0004 | 0.0006 | 0.0005 | 0.0002 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |
| Surface Number | 9 | 10 | 11 | 12 | 13 | 14 | 15 | 16 |
| K | -12.4040 | 5.6791 | -27.7800 | -27.8830 | -8.1068 | -23.6470 | -4.3607 | -3.1332 |
| A4 | -0.0244 | 0.0167 | -0.0207 | -0.1669 | 0.0391 | 0.1808 | -0.1119 | -0.0735 |
| A6 | -0.0379 | -0.0443 | 0.0623 | 0.1239 | -0.0113 | -0.1074 | 0.0291 | 0.0232 |
| A8 | 0.0162 | 0.0089 | -0.0618 | -0.0612 | -0.0077 | 0.0338 | -0.0057 | -0.0055 |
| A10 | 0.0066 | 0.0113 | 0.0331 | 0.0205 | 0.0045 | -0.0070 | 0.0009 | 0.0009 |
| A12 | -0.0071 | -0.0080 | -0.0106 | -0.0042 | -0.0011 | 0.0010 | -0.0001 | -0.0001 |
| A14 | 0.0021 | 0.0019 | 0.0020 | 0.0005 | 0.0001 | -0.0001 | 0.0000 | 0.0000 |
| A16 | -0.0002 | -0.0002 | -0.0002 | 0.0000 | 0.0000 | 0.0000 | 0.0000 | 0.0000 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

In this embodiment, the optical system 10 satisfies the following conditions.

| | Fourth Embodiment | | |
|---|---|---|---|
| TTL/Imgh | 1.30 | TTL/f | 1.59 |
| f/R16 | 3.89 | tan(HFOV) | 1.25 |
| SD12/SD21 | 1.300 | T23/CT3 | 0.82 |

Fifth Embodiment

Figure 9:
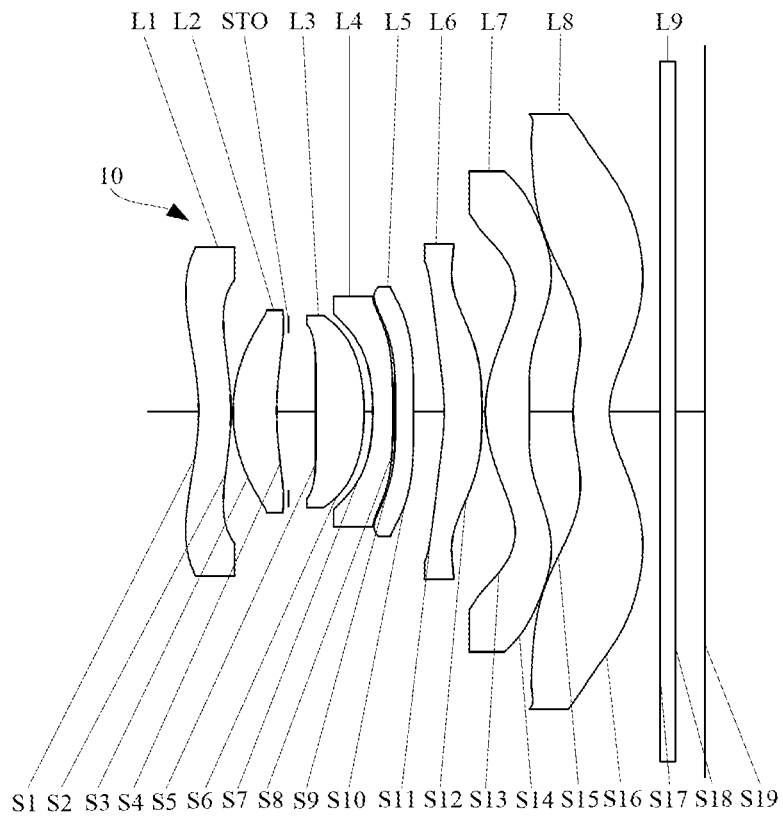
FIG. 9 is a schematic view of an optical system according to a fifth embodiment of the present disclosure.
Figure 10:
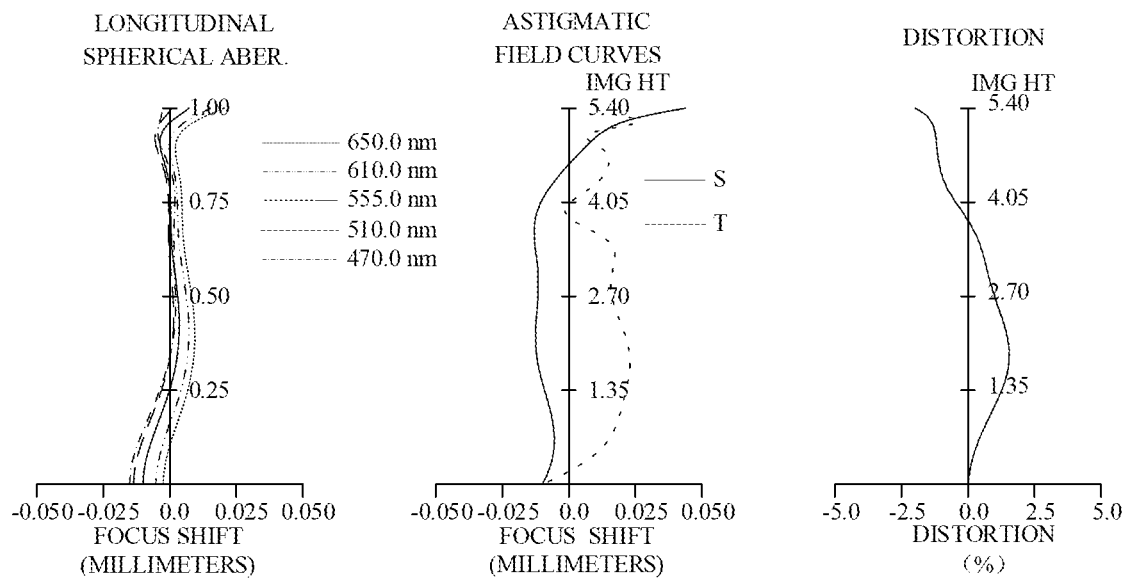
FIG. 10 is a graph showing longitudinal spherical aberration (mm), astigmatism (mm), and distortion (%) of the optical system according to the fifth embodiment.

Referring to FIGS. 9 and 10, in the fifth embodiment, the optical system 10 includes, successively in order from an object side to an image side, a first lens L1 having a negative refractive power, a second lens L2 having a positive refractive power, a stop STO, a third lens L3 having a positive refractive power, a fourth lens L4 having a negative refractive power, a fifth lens L5 having a negative refractive power, a sixth lens L6 having a negative refractive power, a seventh lens L7 having a positive refractive power, and an eighth lens L8 having a negative refractive power. A longitudinal spherical aberration diagram (mm), an astigmatism diagram (mm), and a distortion diagram (%) of the optical system 10 in the fifth embodiment is included in FIG. 10. The astigmatism diagram and the distortion diagram are graphs at a wavelength of 555 nm.

An object side surface S1 of the first lens L1 is concave at a paraxial area thereof, and an image side surface S2 of the first lens L1 is convex at the paraxial area thereof. the object side surface S1 is convex at a circumference thereof, and the image side surface S2 is concave at the circumference thereof.

An object side surface S3 of the second lens L2 is convex at a paraxial area thereof, and an image side surface S4 of the second lens L2 is concave at the paraxial area thereof. The object side surface S3 is concave at a circumference thereof, and the image side surface S4 is convex at the circumference thereof.

An object side surface S5 of the third lens L3 is convex at a paraxial area thereof, and an image side surface S6 of the third lens L3 is convex at the paraxial area thereof. the object side surface S5 is concave at a circumference thereof, and the image side surface S6 is convex at the circumference thereof.

An object side surface S7 of the fourth lens L4 is concave at a paraxial area thereof, and an image side surface S8 of the fourth lens L4 is convex at the paraxial area thereof. The object side surface S7 is concave at a circumference thereof, and the image side surface S8 is concave at the circumference thereof.

An object side surface S9 of the fifth lens L5 is concave at a paraxial area thereof, and an image side surface S10 of the fifth lens L5 is concave at the paraxial area thereof. The object side surface S9 is convex at a circumference thereof, and the image side surface S10 is concave at the circumference thereof.

An object side surface S11 of the sixth lens L6 is concave at a paraxial area thereof, and an image side surface S12 of the sixth lens L6 is convex at the paraxial area thereof. The object side surface S11 is concave at a circumference thereof, and the image side surface S12 is convex at the circumference thereof.

An object side surface S13 of the seventh lens L7 is convex at a paraxial area thereof, and an image side surface S14 of the seventh lens L7 is convex at the paraxial area thereof. The object side surface S13 is concave at a circumference thereof, and the image side surface S14 is convex at the circumference thereof.

An object side surface S15 of the eighth lens L8 is convex at a paraxial area thereof, and an image side surface S16 of the eighth lens L8 is concave at the paraxial area thereof. The object side surface S15 is convex at a circumference thereof, and the image side surface S16 is concave at the circumference thereof.

In addition, various parameters of the lenses of the optical system 10 in the fifth embodiment are shown in Table 9 and Table 10. Definitions of the various structures and parameters can be obtained from the first embodiment, and which will not be repeated herein.

TABLE 9

Fifth Embodiment
f = 4.42 mm, FNO = 1.85, FOV = 102.4°, TTL = 7 mm

| Surface Number | Surface Name | Surface Shape | Y radius (mm) | Thickness (mm) | Material | Refractive index | Abbe number | Focal Length (mm) |
|---|---|---|---|---|---|---|---|---|
| | Object Surface | Spherical | Infinite | Infinite | | | | |
| 1 | First | Aspherical | −3.8452 | 0.4454 | Plastic | 1.54 | 55.75 | −122.06 |
| 2 | Lens | Aspherical | −4.2507 | 0.0300 | | | | |
| 3 | Second | Aspherical | 2.3456 | 0.6037 | Plastic | 1.54 | 55.75 | 7.57 |
| 4 | Lens | Aspherical | 5.0748 | 0.1647 | | | | |
| | Stop | Aspherical | 1.00E+18 | 0.3759 | | | | |
| 5 | Third | Aspherical | 73.1048 | 0.6660 | Plastic | 1.54 | 56.11 | 6.38 |
| 6 | Lens | Aspherical | −3.6298 | 0.1220 | | | | |
| 7 | Fourth | Aspherical | −3.7813 | 0.2801 | Plastic | 1.66 | 20.38 | −8.47 |
| 8 | Lens | Aspherical | −12.0000 | 0.0300 | | | | |
| 9 | Fifth | Aspherical | −74.4954 | 0.2500 | Plastic | 1.54 | 56.11 | −127.39 |
| 10 | Lens | Aspherical | 998.0000 | 0.4271 | | | | |
| 11 | Sixth | Aspherical | −3.6789 | 0.5193 | Plastic | 1.57 | 37.40 | −7.55 |
| 12 | Lens | Aspherical | −27.4593 | 0.0503 | | | | |
| 13 | Seventh | Aspherical | 2.0014 | 0.6060 | Plastic | 1.54 | 55.75 | 3.27 |
| 14 | Lens | Aspherical | −12.4113 | 0.6059 | | | | |
| 15 | Eighth | Aspherical | 2.4239 | 0.5020 | Plastic | 1.54 | 55.75 | −5.07 |
| 16 | Lens | Aspherical | 1.1872 | 0.7003 | | | | |
| 17 | Infrared | Spherical | Infinite | 0.2100 | Glass | | | |
| 18 | Cut-off Filter | Spherical | Infinite | 0.4113 | | | | |
| | Imaging Surface | Spherical | Infinite | 0.0000 | | | | |

Note:
the reference wavelength is 555 nm

TABLE 10

| Surface Number | 1 | 2 | 3 | 4 | 5 | 6 | 7 | 8 |
|---|---|---|---|---|---|---|---|---|
| K | −1.2817 | −5.7810 | −11.6878 | −7.2294 | 3.3331 | −1.9182 | −1.6194 | −7.5380 |
| A4 | 0.0345 | 0.0353 | 0.1030 | −0.0232 | −0.0190 | −0.0489 | −0.0354 | 0.0163 |
| A6 | −0.0092 | −0.0121 | −0.0864 | 0.0143 | −0.0056 | −0.0262 | −0.0416 | −0.0782 |
| A8 | 0.0034 | 0.0075 | 0.0808 | −0.0138 | 0.0010 | 0.0383 | 0.0150 | 0.0752 |
| A10 | −0.0009 | −0.0029 | −0.0593 | 0.0088 | −0.0120 | −0.0341 | −0.0015 | −0.0529 |
| A12 | 0.0001 | 0.0008 | 0.0297 | −0.0046 | 0.0127 | 0.0161 | 0.0004 | 0.0238 |
| A14 | 0.0000 | −0.0001 | −0.0087 | 0.0010 | −0.0076 | −0.0042 | 0.0004 | −0.0057 |
| A16 | 0.0000 | 0.0000 | 0.0010 | 0.0000 | 0.0015 | 0.0004 | −0.0002 | 0.0006 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |
| Surface Number | 9 | 10 | 11 | 12 | 13 | 14 | 15 | 16 |
| K | −5.1641 | −12.4040 | −27.7800 | −7.8830 | −8.6649 | −16.9991 | −4.0007 | −3.2604 |
| A4 | −0.0212 | −0.0025 | 0.0071 | −0.1753 | 0.0318 | 0.1881 | −0.1057 | −0.0647 |
| A6 | −0.1270 | −0.0735 | 0.0280 | 0.1295 | −0.0033 | −0.1010 | 0.0246 | 0.0187 |
| A8 | 0.1592 | 0.0591 | −0.0389 | −0.0639 | −0.0101 | 0.0293 | −0.0039 | −0.0040 |
| A10 | −0.0961 | −0.0194 | 0.0237 | 0.0214 | 0.0047 | −0.0056 | 0.0006 | 0.0006 |
| A12 | 0.0320 | 0.0016 | −0.0082 | −0.0044 | −0.0010 | 0.0007 | −0.0001 | −0.0001 |
| A14 | −0.0056 | 0.0004 | 0.0016 | 0.0005 | 0.0001 | −0.0001 | 0.0000 | 0.0000 |
| A16 | 0.0004 | −0.0001 | −0.0002 | 0.0000 | 0.0000 | 0.0000 | 0.0000 | 0.0000 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

In this embodiment, the optical system 10 satisfies the following conditions.

| Fifth Embodiment | | | |
|---|---|---|---|
| TTL/Imgh | 1.30 | TTL/f | 1.58 |
| f/R16 | 3.72 | tan(HFOV) | 1.24 |
| SD12/SD21 | 1.296 | T23/CT3 | 0.81 |

Sixth Embodiment

Figure 11:
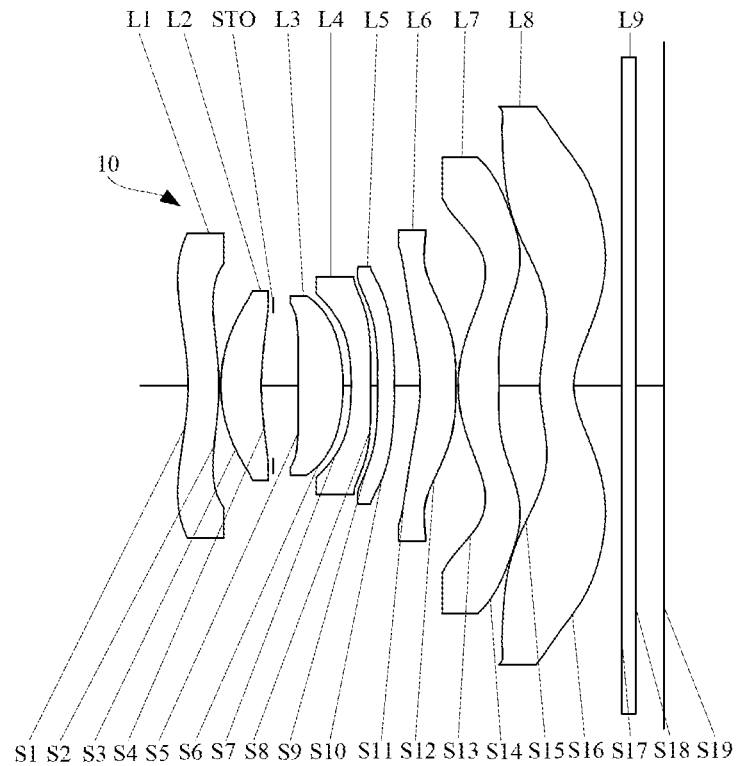
FIG. 11 is a schematic view of an optical system according to a sixth embodiment of the present disclosure.
Figure 12:
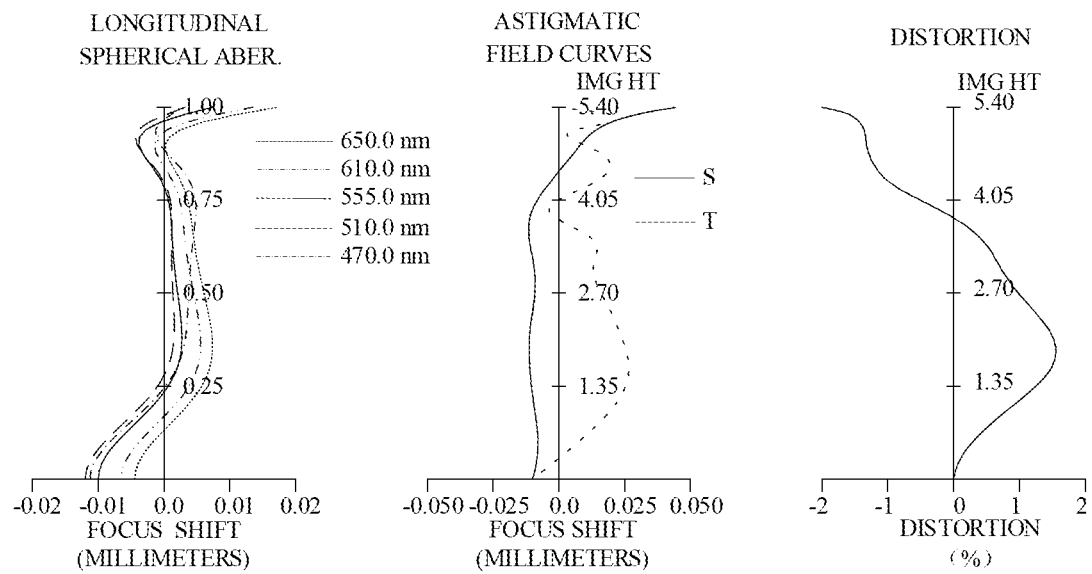
FIG. 12 is a graph showing longitudinal spherical aberration (mm), astigmatism (mm), and distortion (%) of the optical system according to the sixth embodiment.

Referring to FIGS. 11 and 12, in the sixth embodiment, the optical system 10 includes, successively in order from an object side to an image side, a first lens L1 having a negative refractive power, a second lens L2 having a positive refractive power, a stop STO, a third lens L3 having a positive refractive power, a fourth lens L4 having a negative refractive power, a fifth lens L5 having a positive refractive power, a sixth lens L6 having a negative refractive power, a seventh lens L7 having a positive refractive power, and an eighth lens L8 having a negative refractive power. A longitudinal spherical aberration diagram (mm), an astigmatism diagram (mm), and a distortion diagram (%) of the optical system 10 in the sixth embodiment is included in FIG. 12. The astigmatism diagram and the distortion diagram are graphs at a wavelength of 555 nm.

An object side surface S1 of the first lens L1 is concave at a paraxial area thereof, and an image side surface S2 of the first lens L1 is convex at the paraxial area thereof. the object side surface S1 is convex at a circumference thereof, and the image side surface S2 is concave at the circumference thereof.

An object side surface S3 of the second lens L2 is convex at a paraxial area thereof, and an image side surface S4 of the second lens L2 is concave at the paraxial area thereof. The object side surface S3 is concave at a circumference thereof, and the image side surface S4 is convex at the circumference thereof.

An object side surface S5 of the third lens L3 is convex at a paraxial area thereof, and an image side surface S6 of the third lens L3 is convex at the paraxial area thereof. the object side surface S5 is concave at a circumference thereof, and the image side surface S6 is convex at the circumference thereof.

An object side surface S7 of the fourth lens L4 is concave at a paraxial area thereof, and an image side surface S8 of the fourth lens L4 is concave at the paraxial area thereof. The object side surface S7 is concave at a circumference thereof, and the image side surface S8 is concave at the circumference thereof.

An object side surface S9 of the fifth lens L5 is concave at a paraxial area thereof, and an image side surface S10 of the fifth lens L5 is convex at the paraxial area thereof. The object side surface S9 is convex at a circumference thereof, and the image side surface S10 is concave at the circumference thereof.

An object side surface S11 of the sixth lens L6 is concave at a paraxial area thereof, and an image side surface S12 of the sixth lens L6 is convex at the paraxial area thereof. The object side surface S11 is concave at a circumference thereof, and the image side surface S12 is convex at the circumference thereof.

An object side surface S13 of the seventh lens L7 is convex at a paraxial area thereof, and an image side surface S14 of the seventh lens L7 is convex at the paraxial area thereof. The object side surface S13 is concave at a circumference thereof, and the image side surface S14 is convex at the circumference thereof.

An object side surface S15 of the eighth lens L8 is convex at a paraxial area thereof, and an image side surface S16 of the eighth lens L8 is concave at the paraxial area thereof. The object side surface S15 is convex at a circumference thereof, and the image side surface S16 is concave at the circumference thereof.

In addition, various parameters of the lenses of the optical system 10 in the sixth embodiment are shown in Table 11 and Table 12. Definitions of the various structures and parameters can be obtained from the first embodiment, and which will not be repeated herein.

TABLE 11

Sixth Embodiment
f = 4.44 mm, FNO = 1.88, FOV = 102.3°, TTL = 7.02 mm

| Surface Number | Surface Name | Surface Shape | Y radius (mm) | Thickness (mm) | Material | Refractive index | Abbe number | Focal Length (mm) |
|---|---|---|---|---|---|---|---|---|
|  | Object Surface | Spherical | Infinite | Infinite |  |  |  |  |
| 1 | First Lens | Aspherical | −4.0777 | 0.4538 | Plastic | 1.54 | 55.75 | 105.34 |
| 2 |  | Aspherical | −4.5662 | 0.0300 |  |  |  |  |
| 3 | Second Lens | Aspherical | 2.3387 | 0.5980 | Plastic | 1.54 | 55.75 | 7.68 |
| 4 |  | Aspherical | 4.9486 | 0.1726 |  |  |  |  |
|  | Stop | Spherical | 1.00E+18 | 0.3697 | Plastic |  |  |  |
| 5 | Third Lens | Aspherical | 64.3505 | 0.6613 | Plastic | 1.54 | 56.11 | 6.63 |
| 6 |  | Aspherical | −3.8097 | 0.1227 |  |  |  |  |
| 7 | Fourth Lens | Aspherical | −5.1395 | 0.2868 | Plastic | 1.66 | 20.38 | −7.61 |
| 8 |  | Aspherical | 234.0657 | 0.1028 |  |  |  |  |
| 9 | Fifth Lens | Aspherical | −24.0206 | 0.2500 | Plastic | 1.54 | 56.11 | 26.50 |
| 10 |  | Aspherical | −9.0426 | 0.3785 |  |  |  |  |
| 11 | Sixth Lens | Aspherical | −2.9365 | 0.5278 | Plastic | 1.57 | 37.40 | −7.06 |
| 12 |  | Aspherical | −11.7067 | 0.0308 |  |  |  |  |
| 13 | Seventh Lens | Aspherical | 2.1497 | 0.6060 | Plastic | 1.54 | 55.75 | 3.41 |
| 14 |  | Aspherical | −10.8384 | 0.6022 |  |  |  |  |
| 15 | Eighth Lens | Aspherical | 2.4286 | 0.5020 | Plastic | 1.54 | 55.75 | −4.98 |
| 16 |  | Aspherical | 1.1792 | 0.7038 |  |  |  |  |
| 17 | Infrared Cut-off Filter | Spherical | Infinite | 0.2100 | Glass |  |  |  |
| 18 |  | Spherical | Infinite | 0.4113 |  |  |  |  |
|  | Imaging Surface | Spherical | Infinite | 0.0000 |  |  |  |  |

Note:
the reference wavelength is 555 nm

TABLE 12

| Surface Number | 1 | 2 | 3 | 4 | 5 | 6 | 7 | 8 |
|---|---|---|---|---|---|---|---|---|
| K | −1.3217 | −6.6965 | −12.5288 | −6.6809 | −10.0000 | −1.9732 | 0.9859 | −12.4040 |
| A4 | 0.0353 | 0.0369 | 0.1104 | −0.0234 | −0.0174 | −0.0510 | −0.0786 | −0.0545 |
| A6 | −0.0094 | −0.0123 | −0.0971 | 0.0130 | −0.0079 | −0.0287 | −0.0108 | 0.0116 |
| A8 | 0.0035 | 0.0075 | 0.0896 | −0.0081 | 0.0052 | 0.0621 | 0.0442 | 0.0042 |
| A10 | −0.0009 | −0.0028 | −0.0632 | 0.0004 | −0.0173 | −0.0758 | −0.0686 | −0.0167 |
| A12 | 0.0002 | 0.0007 | 0.0301 | 0.0017 | 0.0179 | 0.0480 | 0.0487 | 0.0121 |
| A14 | 0.0000 | −0.0001 | −0.0085 | −0.0013 | −0.0102 | −0.0157 | −0.0155 | −0.0035 |
| A16 | 0.0000 | 0.0000 | 0.0010 | 0.0003 | 0.0020 | 0.0020 | 0.0018 | 0.0004 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

| Surface Number | 9 | 10 | 11 | 12 | 13 | 14 | 15 | 16 |
|---|---|---|---|---|---|---|---|---|
| K | 7.5960 | −12.4040 | −19.8565 | −27.8750 | −8.8148 | −23.6470 | −3.6255 | −3.2624 |
| A4 | −0.0406 | 0.0040 | −0.0270 | −0.1658 | 0.0368 | 0.2004 | −0.1085 | −0.0645 |
| A6 | −0.0061 | −0.0046 | 0.0770 | 0.1173 | −0.0062 | −0.1105 | 0.0260 | 0.0187 |
| A8 | −0.0099 | −0.0320 | −0.0744 | −0.0545 | −0.0096 | 0.0331 | −0.0045 | −0.0040 |
| A10 | 0.0214 | 0.0357 | 0.0396 | 0.0169 | 0.0048 | −0.0065 | 0.0007 | 0.0006 |
| A12 | −0.0127 | −0.0162 | −0.0127 | −0.0032 | −0.0011 | 0.0009 | −0.0001 | −0.0001 |
| A14 | 0.0033 | 0.0034 | 0.0024 | 0.0003 | 0.0001 | −0.0001 | 0.0000 | 0.0000 |
| A16 | −0.0003 | −0.0003 | −0.0003 | 0.0000 | 0.0000 | 0.0000 | 0.0000 | 0.0000 |
| A18 | 0.0000 | 0.0000 | 0.0000 | 0.0000 | 0.0000 | 0.0000 | 0.0000 | 0.0000 |
| A20 | 0.0000 | 0.0000 | 0.0000 | 0.0000 | 0.0000 | 0.0000 | 0.0000 | 0.0000 |

In this embodiment, the optical system 10 satisfies the following conditions.

| Sixth Embodiment | | | |
|---|---|---|---|
| TTL/Imgh | 1.30 | TTL/f | 1.58 |
| f/R16 | 3.77 | tan(HFOV) | 1.24 |
| SD12/SD21 | 1.285 | T23/CT3 | 0.82 |

Figure 13:
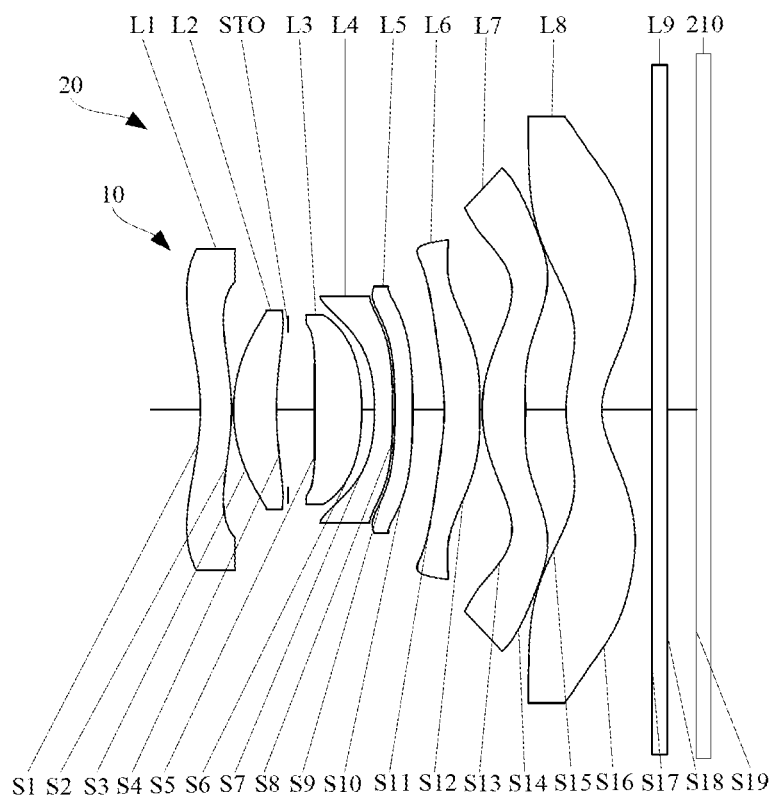
FIG. 13 is a schematic view of a camera module according to an embodiment of the present disclosure.

Referring to FIG. 13, in an embodiment of the present disclosure, the optical system 10 and a photosensitive element 210 are assembled to form a camera module 20. The photosensitive element 210 is arranged on the image side of the eighth lens L8, that is, on the image side of the optical system 10. Generally, a photosensitive surface of the photosensitive element 210 overlaps the imaging surface S19 of the optical system 10. In this embodiment, an infrared cut-off filter L9 is further arranged between the eighth lens L8 and the photosensitive element 210. The photosensitive element 210 may be a Charge Coupled Device (CCD) or a Complementary Metal Oxide Semiconductor (CMOS). By adopting the above optical system 10, the camera module 20 can have excellent capturing quality.

In some embodiments, a distance between the photosensitive element 210 and each of the lenses in the optical system 10 is relatively fixed. As such, the camera module 20 is a fixed focus module. In other embodiments, a driving mechanism such as a voice coil motor may be provided to enable the photosensitive element 210 to move relative to each of the lenses in the optical system 10, thereby achieving a focusing effect. Specifically, a coil electrically connected to a driving chip is provided on a lens barrel equipped with the above lenses, and the camera module 20 is further provided with a magnet. The magnetic force between the energized coil and the magnet is used to drive the lens barrel to move relative to the photosensitive element 210, thereby achieving a focusing effect. In other embodiments, a similar driving mechanism can also be provided to drive part of the lenses in the optical system 10 to move, so as to achieve an optical zooming effect.

Figure 14:
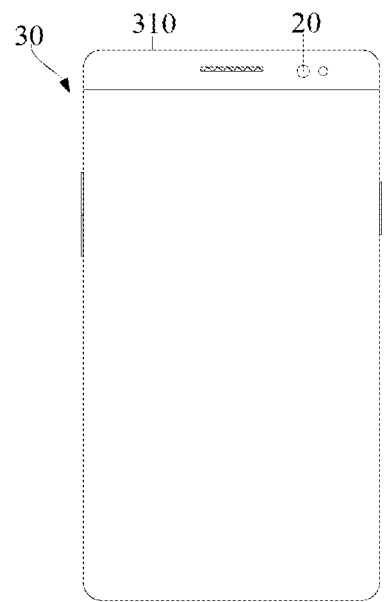
FIG. 14 is a schematic view of an electronic device according to an embodiment of the present disclosure.

Referring to FIG. 14, some embodiments of the present disclosure further provide an electronic device 30. The camera module 20 is applied to the electronic device 30 such that the electronic device 30 has a capturing function. Specifically, the electronic device 30 includes a fixing member 310. The camera module 20 is mounted on the fixing member 310. The fixing member 310 may be a circuit board, a middle frame, and the like. The electronic device 30 includes, but is not limited to, smart phones, smart watches, e-book readers, in-vehicle camera devices, monitoring devices, medical devices (such as endoscopes), tablet computers, biometric devices (such as fingerprint recognition devices or pupil recognition devices), personal digital assistants (PDAs), unmanned aerial vehicles, etc. Specifically, in some embodiments, the electronic device 30 is a smart phone. The smart phone includes a middle frame and a circuit board provided in the middle frame. The camera module 20 is mounted in the middle frame of the smart phone. The photosensitive element 210 therein is electrically connected to the circuit board. The camera module 20 can be used as a front camera module or a rear camera module of a smart phone. By adopting the above camera module 20 according to the embodiments of the present disclosure, the electronic device 30 can have excellent capturing function.

In the description of the present disclosure, it should be understood that orientation or positional conditions indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. are based on orientation or positional condition shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is at least two, for example, two, three or the like, unless explicitly and specifically defined otherwise.

In the present disclosure, unless explicitly specified and defined otherwise, terms "mounting", "connecting", "connected", and "fixing" should be understood in a broad sense. For example, it may be a fixed connection or a detachable connection, or an integration; may be a mechanical connection or electrical connection; may be a direct connection, or may be a connection through an intermediate medium, may be the communication between two elements or the interaction between two elements, unless explicitly defined otherwise. The specific meanings of the above terms in the present disclosure can be understood by one of those ordinary skills in the art according to specific circumstances.

In the present disclosure, unless expressly specified and defined otherwise, a first feature being "on" or "below" a second feature may mean that the first feature is in direct contact with the second feature, or may mean that the first feature is in indirect contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

In the description of this specification, descriptions referring to terms "one embodiment", "some embodiments", "examples", "specific examples", or "some examples" and the like mean that specific features, structures, materials, or characteristics described in conjunction with the embodiment or example are included in at least one embodiment or example of the present disclosure. In this specification, schematic representations of the above terms do not necessarily refer to the same embodiment or example. Moreover, the described specific features, structures, materials, or characteristics can be combined in any one or more embodiments or examples in a suitable manner. In addition, if there is no contradiction, the different embodiments or examples and the features of the different embodiments or examples described in this specification can be combined and incorporated by those skilled in the art.

The technical features of the above-mentioned embodiments can be combined arbitrarily. In order to simply the description, all possible combinations of the technical features in the above-mentioned embodiments are not described. However, as long as there is no contradiction in the combinations of these technical features, they should be considered to be fallen into the range described in the present specification.

Only several embodiments of the present disclosure are illustrated in the above-mentioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. An optical system, comprising, successively in order from an object side to an image side:
    a first lens having a refractive power, an object side surface of the first lens being concave at a paraxial area thereof, and an image side surface of the first lens being convex at the paraxial area thereof;
    a second lens having a positive refractive power, an object side surface of the second lens being convex at a paraxial area thereof, and an image side surface of the second lens being concave at the paraxial area thereof;

a third lens having a positive refractive power, and an image side surface of the third lens being convex at a paraxial area thereof;

a fourth lens having a negative refractive power, and an object side surface of the fourth lens being concave at a paraxial area thereof;

a fifth lens having a refractive power;

a sixth lens having a negative refractive power, and an object side surface of the sixth lens being concave at a paraxial area thereof;

a seventh lens having a positive refractive power, and an object side surface of the seventh lens being convex at a paraxial area thereof; and an eighth lens having a negative refractive power, an object side surface of the eighth lens being convex at a paraxial area thereof, and an image side surface of the eighth lens being concave at the paraxial area thereof.

2. The optical system according to claim 1, satisfying the following condition:

$TTL/Imgh<1.36$;

wherein TTL is a distance from the object side surface of the first lens to an imaging surface of the optical system on an optical axis, and Imgh is half of a diagonal length of an effective imaging area of the optical system on the imaging surface.

3. The optical system according to claim 2, satisfying the following condition:

$1.29 \leq TTL/Imgh \leq 1.30$.

4. The optical system according to claim 1, satisfying the following condition:

$2 < f/R16 < 4$;

wherein f is an effective focal length of the optical system, and R16 is a radius of curvature of the image side surface of the eighth lens at an optical axis.

5. The optical system according to claim 4, satisfying the following condition:

$3.72 \leq f/R16 \leq 3.89$.

6. The optical system according to claim 1, satisfying the following condition:

$FNO \leq 2$;

wherein FNO is an f-number of the optical system.

7. The optical system according to claim 6, satisfying the following condition:

$1.78 \leq FNO \leq 1.88$.

8. The optical system according to claim 1, satisfying the following condition:

$1 < SD12/SD21 < 1.4$;

wherein SD12 is a maximum effective semiaperture of the image side surface of the first lens, SD21 is a maximum effective semiaperture of the object side surface of the second lens.

9. The optical system according to claim 8, satisfying the following condition:

$1.276 \leq SD12/SD21 \leq 1.308$.

10. The optical system according to claim 1, satisfying the following condition:

$TTL/f < 1.65$;

wherein TTL is a distance from the object side surface of the first lens to an imaging surface of the optical system on the optical axis, and f is an effective focal length of the optical system.

11. The optical system according to claim 10, satisfying the following condition:

$1.58 \leq TTL/f \leq 1.61$.

12. The optical system according to claim 1, satisfying the following condition:

$\tan(HFOV) > 1.09$;

wherein HFOV is half of a maximum angle of field of view of the optical system.

13. The optical system according to claim 12, satisfying the following condition:

$1.24 \leq \tan(HFOV) \leq 1.25$.

14. The optical system according to claim 1, satisfying the following condition:

$0 < T23/CT3 < 0.9$;

wherein T23 is a distance from the image side surface of the second lens to an object side surface of the third lens on an optical axis, and CT3 is a thickness of the third lens on the optical axis.

15. The optical system according to claim 14, satisfying the following condition:

$0.80 \leq T23/CT3 \leq 0.82$.

16. The optical system according to claim 1, further comprising a stop arranged between the second lens and the third lens.

17. The optical system according to claim 1, wherein each lens in the optical system is made of plastic.

18. The optical system according to claim 1, wherein an object side surface and an image side surface of each lens in the optical system are aspherical.

19. A camera module, comprising:

a photosensitive element; and the optical system according to claim 1, wherein the photosensitive element is arranged on the image side of the optical system.

20. An electronic device, comprising:

a fixing member; and the camera module according to claim 19, wherein the camera module is provided on the fixing member.

* * * * *